(12) United States Patent
Ebner et al.

(10) Patent No.: US 12,508,403 B2
(45) Date of Patent: Dec. 30, 2025

(54) CATHETER INSERTION DEVICE WITH IMPROVED PUSH TAB AND TIP PROTECTOR ASSEMBLY

(71) Applicant: Smiths Medical ASD, Inc., Plymouth, MN (US)

(72) Inventors: Timothy D. Ebner, Plymouth, MN (US); Kathryn Felicito, Plymouth, MN (US); Walton Norfleet, Plymouth, MN (US); Greg Okoniewski, Plymouth, MN (US)

(73) Assignee: ICU Medical. Inc., San Clemente, CA (US)

( * ) Notice: Subject to any disclaimer, the term of this patent is extended or adjusted under 35 U.S.C. 154(b) by 614 days.

(21) Appl. No.: 16/855,511

(22) Filed: Apr. 22, 2020

(65) Prior Publication Data
US 2020/0338314 A1 Oct. 29, 2020

Related U.S. Application Data

(60) Provisional application No. 62/837,648, filed on Apr. 23, 2019.

(51) Int. Cl.
*A61M 25/06* (2006.01)

(52) U.S. Cl.
CPC .... *A61M 25/0618* (2013.01); *A61M 25/0606* (2013.01); *A61M 2205/586* (2013.01)

(58) Field of Classification Search
CPC .......... A61M 25/0618; A61M 25/0606; A61M 25/06; A61M 25/0612; A61M 25/0625; A61M 25/0631; A61M 25/0637; A61M 2205/586; A61M 5/3273
See application file for complete search history.

(56) References Cited

U.S. PATENT DOCUMENTS

| | | | |
|---|---|---|---|
| 1,085,505 | A | 1/1914 | Stafford |
| 3,055,364 | A | 9/1962 | Myerson et al. |
| 3,477,437 | A | 11/1969 | Goldberg |
| 3,666,373 | A | 5/1972 | Reed |

(Continued)

FOREIGN PATENT DOCUMENTS

| | | |
|---|---|---|
| CA | 2033361 | 11/2002 |
| CN | 1547493 | 11/2004 |

(Continued)

OTHER PUBLICATIONS

ISA; International Search Report for International Application No. PCT/US2006/025530 mailed on Jun. 9, 2007.

(Continued)

*Primary Examiner* — Bhisma Mehta
*Assistant Examiner* — Adam J. Cermak
(74) *Attorney, Agent, or Firm* — Louis Woo

(57) ABSTRACT

Improved tip protector assemblies (TPAs) and catheter hubs are provided for use with I.V. catheters. An improved TPA includes an upstanding push tab configured to facilitate one-handed placement of the catheter. The disclosure also provides a hinging push tab usable to fluidically seal or at least cover the proximal fitment of a catheter hub once the catheter is placed and the TPA removed. Improved TPAs are disclosed that mitigate off-axis loading and accidental premature detachment from the catheter hub.

14 Claims, 19 Drawing Sheets

(56) References Cited

U.S. PATENT DOCUMENTS

| | | | |
|---|---|---|---|
| 3,680,562 A | 8/1972 | Wittes | |
| 4,425,120 A | 1/1984 | Sampson et al. | |
| 4,755,170 A | 7/1988 | Golden | |
| 4,778,453 A | 10/1988 | Lopez | |
| 4,781,692 A | 11/1988 | Jagger et al. | |
| 4,795,432 A | 1/1989 | Karczmer | |
| 4,804,371 A | 2/1989 | Vaillancourt | |
| 4,834,718 A | 5/1989 | McDonald | |
| 4,846,805 A | 7/1989 | Sitar | |
| 4,887,998 A | 12/1989 | Martin et al. | |
| 4,921,490 A | 5/1990 | Spier et al. | |
| 4,929,241 A | 5/1990 | Kulli | |
| 4,944,725 A | 7/1990 | McDonald | |
| 4,944,728 A | 7/1990 | Carrell et al. | |
| 4,952,207 A | 8/1990 | Lemieux | |
| 4,964,854 A | 10/1990 | Luther | |
| 4,994,041 A | 2/1991 | Domlorowski et al. | |
| 5,059,180 A | 10/1991 | Mclees | |
| 5,085,648 A | 2/1992 | Purdy et al. | |
| 5,092,857 A | 3/1992 | Ragner | |
| 5,102,394 A | 4/1992 | Asaitis et al. | |
| 5,108,379 A | 4/1992 | Dolgin et al. | |
| 5,129,884 A | 7/1992 | Dysarz | |
| 5,135,504 A | 8/1992 | Mclees | |
| 5,156,599 A | 10/1992 | Ranford et al. | |
| 5,183,468 A | 2/1993 | Mclees | |
| 5,205,829 A | 4/1993 | Lituchy | |
| 5,215,525 A | 6/1993 | Sturman | |
| 5,215,528 A * | 6/1993 | Purdy | A61M 5/3273 604/164.08 |
| 5,217,438 A | 6/1993 | Davis et al. | |
| RE34,416 E | 10/1993 | Lemieux | |
| 5,269,765 A | 12/1993 | Kuracina | |
| 5,279,591 A | 1/1994 | Simon | |
| 5,295,963 A | 3/1994 | Deeks | |
| 5,300,039 A | 4/1994 | Poulsen | |
| 5,300,045 A | 4/1994 | Plassche, Jr. | |
| 5,306,259 A | 4/1994 | Fischell et al. | |
| 5,322,517 A | 6/1994 | Sircom et al. | |
| 5,328,482 A | 7/1994 | Sircom et al. | |
| 5,330,432 A | 7/1994 | Yoon | |
| 5,334,158 A | 8/1994 | Mclees | |
| 5,336,199 A | 8/1994 | Castillo et al. | |
| 5,344,408 A | 9/1994 | Partika | |
| 5,364,370 A | 11/1994 | Szerlip et al. | |
| 5,376,080 A | 12/1994 | Petrussa | |
| 5,409,461 A | 4/1995 | Steinman | |
| 5,419,766 A | 5/1995 | Chang et al. | |
| 5,423,766 A | 6/1995 | Dicesare | |
| 5,458,658 A | 10/1995 | Sircom | |
| 5,466,223 A | 11/1995 | Bressler et al. | |
| 5,472,430 A | 12/1995 | Vaillancourt et al. | |
| 5,478,313 A | 12/1995 | White | |
| 5,522,835 A | 6/1996 | Tovey | |
| 5,533,974 A | 7/1996 | Gaba | |
| 5,558,651 A | 9/1996 | Crawford et al. | |
| 5,569,202 A | 10/1996 | Kovalic et al. | |
| 5,573,510 A * | 11/1996 | Isaacson | A61M 25/0631 604/158 |
| 5,584,809 A | 12/1996 | Gaba | |
| 5,584,810 A | 12/1996 | Brimhall | |
| 5,599,310 A | 2/1997 | Bogert | |
| 5,601,532 A | 2/1997 | Gaba | |
| 5,601,536 A | 2/1997 | Crawford et al. | |
| 5,611,781 A | 3/1997 | Sircom et al. | |
| 5,613,500 A | 3/1997 | Bishop | |
| 5,645,539 A | 7/1997 | Solomon et al. | |
| 5,662,610 A | 9/1997 | Sircom | |
| 5,665,072 A | 9/1997 | Yoon | |
| 5,676,656 A | 10/1997 | Brimhall | |
| 5,676,658 A | 10/1997 | Erskine | |
| 5,690,619 A | 11/1997 | Erskine | |
| 5,695,474 A | 12/1997 | Daugherty | |
| 5,697,907 A | 12/1997 | Gaba | |
| 5,713,876 A * | 2/1998 | Bogert | A61M 25/0631 604/243 |
| 5,718,688 A | 2/1998 | Wozencroft | |
| 5,738,660 A | 4/1998 | Luther | |
| 5,743,891 A | 4/1998 | Tolkoff et al. | |
| 5,769,827 A | 6/1998 | DeMichele et al. | |
| 5,795,336 A | 8/1998 | Romano et al. | |
| 5,800,395 A | 9/1998 | Botich et al. | |
| 5,800,404 A | 9/1998 | Poulsen | |
| 5,817,070 A | 10/1998 | Tamaro | |
| 5,830,189 A | 11/1998 | Chang | |
| 5,853,393 A | 12/1998 | Bogert | |
| 5,865,806 A | 2/1999 | Howell | |
| 5,879,337 A | 3/1999 | Kuracina et al. | |
| 5,882,337 A | 3/1999 | Bogert et al. | |
| 5,882,342 A | 3/1999 | Cooper et al. | |
| 5,893,845 A | 4/1999 | Newby et al. | |
| 5,911,705 A | 6/1999 | Howell | |
| 5,919,168 A | 7/1999 | Wheeler | |
| 5,935,109 A | 8/1999 | Donnan | |
| 5,937,605 A | 8/1999 | Wendt | |
| 6,001,080 A | 12/1999 | Kuracina et al. | |
| 6,004,294 A | 12/1999 | Brimhall et al. | |
| 6,007,244 A | 12/1999 | Dinder | |
| 6,077,244 A | 6/2000 | Botich et al. | |
| 6,096,005 A | 8/2000 | Botich et al. | |
| 6,117,108 A | 9/2000 | Woehr et al. | |
| 6,203,527 B1 | 3/2001 | Zadini et al. | |
| 6,210,374 B1 | 4/2001 | Malencheck | |
| 6,213,978 B1 | 4/2001 | Voyten | |
| 6,221,047 B1 | 4/2001 | Greene et al. | |
| 6,224,569 B1 | 5/2001 | Brimhall | |
| 6,228,054 B1 | 5/2001 | Dysarz | |
| 6,280,419 B1 | 8/2001 | Vojtasek | |
| 6,287,278 B1 | 9/2001 | Woehr et al. | |
| 6,298,623 B1 | 10/2001 | Wendt | |
| 6,322,537 B1 | 11/2001 | Chang | |
| 6,379,333 B1 | 4/2002 | Brimhall et al. | |
| 6,443,927 B1 | 9/2002 | Cook | |
| 6,443,929 B1 | 9/2002 | Kuracina et al. | |
| 6,511,461 B2 | 1/2003 | Jonsson | |
| 6,524,278 B1 | 2/2003 | Campbell et al. | |
| 6,527,747 B2 | 3/2003 | Adams et al. | |
| 6,544,231 B1 | 4/2003 | Palmer et al. | |
| 6,547,762 B1 | 4/2003 | Bolich et al. | |
| 6,547,764 B2 | 4/2003 | Larsen et al. | |
| 6,558,354 B1 | 5/2003 | Howell | |
| 6,582,402 B1 | 6/2003 | Erskine | |
| 6,595,954 B1 | 7/2003 | Luther et al. | |
| 6,595,955 B2 * | 7/2003 | Ferguson | A61M 25/0625 604/110 |
| 6,616,630 B1 | 9/2003 | Woehr et al. | |
| 6,623,458 B2 | 9/2003 | Woehr et al. | |
| 6,629,957 B1 | 10/2003 | Wiklund | |
| 6,629,959 B2 | 10/2003 | Kuracina et al. | |
| 6,632,198 B2 | 10/2003 | Caizza | |
| 6,652,486 B2 | 11/2003 | Bialecki et al. | |
| 6,652,490 B2 | 11/2003 | Howell | |
| 6,673,044 B2 | 1/2004 | Righi et al. | |
| 6,689,102 B2 | 2/2004 | Greene | |
| 6,695,814 B2 | 2/2004 | Greene et al. | |
| 6,706,019 B1 | 3/2004 | Parker et al. | |
| 6,709,419 B2 | 3/2004 | Woehr | |
| 6,712,787 B1 | 3/2004 | Dysarz | |
| 6,716,197 B2 | 4/2004 | Suendsen | |
| 6,726,658 B2 | 4/2004 | Hochman | |
| 6,732,991 B1 | 5/2004 | Zakrzewski et al. | |
| 6,749,588 B1 | 6/2004 | Howell et al. | |
| 6,776,777 B2 | 8/2004 | Barrelle | |
| 6,786,875 B2 | 9/2004 | Barker et al. | |
| 6,796,962 B2 | 9/2004 | Ferguson et al. | |
| 6,822,545 B2 | 11/2004 | Vaillancount | |
| 6,860,871 B2 | 3/2005 | Kuracina et al. | |
| 6,869,415 B2 | 3/2005 | Asbaghi | |
| 6,872,193 B2 | 3/2005 | Shaw et al. | |
| 6,902,546 B2 | 6/2005 | Ferguson | |
| 6,905,478 B2 | 6/2005 | Ingram et al. | |
| 6,972,002 B2 | 12/2005 | Thorne | |
| RE38,996 E | 2/2006 | Crawford et al. | |

(56) References Cited

U.S. PATENT DOCUMENTS

| | | |
|---|---|---|
| 6,994,690 B2 | 2/2006 | Kiehne |
| 7,004,927 B2 | 2/2006 | Ferguson et al. |
| 7,008,402 B2 | 3/2006 | Ferguson et al. |
| 7,014,622 B1 | 3/2006 | Pressly, Sr. et al. |
| 7,014,623 B2 | 3/2006 | Prestidge et al. |
| 7,018,344 B2 | 3/2006 | Bressler et al. |
| 7,041,086 B2 | 5/2006 | Yang |
| 7,041,092 B2 | 5/2006 | Barrelle |
| 7,083,600 B2 | 8/2006 | Meloul |
| 7,125,397 B2 | 10/2006 | Woehr et al. |
| 7,172,576 B2 | 2/2007 | Sawa et al. |
| 7,201,740 B2 | 4/2007 | Crawford |
| 7,214,211 B2 | 5/2007 | Woehr et al. |
| 7,220,247 B2 | 5/2007 | Shaw et al. |
| 7,238,169 B2 | 7/2007 | Takagi et al. |
| 7,255,689 B2 | 8/2007 | Westbye |
| 7,300,416 B2 | 11/2007 | Botich et al. |
| 7,344,517 B2 | 3/2008 | Schiller |
| 7,347,838 B2 | 3/2008 | Kulli |
| 7,354,422 B2 | 4/2008 | Riesenberger et al. |
| 7,393,344 B2 | 7/2008 | Mohammed |
| 7,597,681 B2 | 10/2009 | Sutton et al. |
| 7,632,243 B2 | 12/2009 | Bialecki et al. |
| 7,658,725 B2 | 2/2010 | Bialecki et al. |
| 7,753,877 B2 | 7/2010 | Bialecki et al. |
| 7,785,296 B2 | 8/2010 | Muskatello et al. |
| 7,828,774 B2 | 11/2010 | Harding et al. |
| 8,162,881 B2 | 4/2012 | Lilley, Jr. et al. |
| 8,257,322 B2 | 9/2012 | Koehler et al. |
| 8,512,295 B2 | 8/2013 | Evans |
| 9,555,220 B2 | 1/2017 | Koehler |
| 11,185,668 B2 | 11/2021 | Dalena et al. |
| 2002/0169418 A1 | 11/2002 | Menzi et al. |
| 2002/0193745 A1 | 12/2002 | Ferguson |
| 2003/0018303 A1 | 1/2003 | Sharp |
| 2003/0060771 A1 | 3/2003 | Bialecki et al. |
| 2003/0100868 A1 | 5/2003 | Ferguson et al. |
| 2003/0105431 A1 | 6/2003 | Howell |
| 2003/0144627 A1 | 7/2003 | Woehr et al. |
| 2003/0199827 A1 | 10/2003 | Thorne |
| 2004/0019332 A1 | 1/2004 | Grabis et al. |
| 2004/0030294 A1 | 2/2004 | Mahurkar |
| 2004/0049155 A1 | 3/2004 | Schramm |
| 2004/0078003 A1 | 4/2004 | Smith et al. |
| 2004/0092889 A1 | 5/2004 | Ferguson et al. |
| 2004/0097887 A1 | 5/2004 | Secrest et al. |
| 2004/0102735 A1* | 5/2004 | Moulton ............ A61M 25/0612 604/164.04 |
| 2004/0116854 A1 | 6/2004 | Abulhaj et al. |
| 2004/0122373 A1 | 6/2004 | Bolich et al. |
| 2004/0186434 A1 | 9/2004 | Harding et al. |
| 2004/0204681 A1 | 10/2004 | Thoresen et al. |
| 2004/0225260 A1* | 11/2004 | Villa ................ A61M 5/3273 604/164.01 |
| 2004/0236288 A1 | 11/2004 | Howell et al. |
| 2005/0027263 A1 | 2/2005 | Woehr et al. |
| 2005/0038384 A1 | 2/2005 | Li |
| 2005/0075609 A1 | 4/2005 | Latona |
| 2005/0080378 A1 | 4/2005 | Cindrich et al. |
| 2005/0096592 A1 | 5/2005 | Carlyon et al. |
| 2005/0107740 A1 | 5/2005 | Jensen et al. |
| 2005/0113750 A1 | 5/2005 | Targell |
| 2005/0113755 A1 | 5/2005 | Greene et al. |
| 2005/0159705 A1 | 7/2005 | Crawford et al. |
| 2005/0182362 A1 | 8/2005 | Sircom et al. |
| 2005/0182363 A1 | 8/2005 | Kulli |
| 2005/0277879 A1 | 12/2005 | Daga |
| 2006/0089597 A1 | 4/2006 | Allard |
| 2006/0100588 A1 | 5/2006 | Brunnberg et al. |
| 2006/0116638 A1 | 6/2006 | Woehr et al. |
| 2006/0189942 A1* | 8/2006 | Chang ............... A61M 25/0631 604/164.08 |
| 2007/0038184 A1 | 2/2007 | Bialecki et al. |
| 2007/0038185 A1 | 2/2007 | Albert et al. |
| 2007/0038188 A1 | 2/2007 | Bialecki |
| 2007/0073222 A1 | 3/2007 | Lilley et al. |
| 2007/0093778 A1 | 4/2007 | Cindrich et al. |
| 2007/0112305 A1 | 5/2007 | Brimhall |
| 2007/0129674 A1 | 6/2007 | Liversidge |
| 2007/0191775 A1 | 8/2007 | Diep |
| 2007/0191776 A1 | 8/2007 | Bialecki |
| 2007/0191777 A1 | 8/2007 | King |
| 2007/0270758 A1 | 11/2007 | Hanner et al. |
| 2008/0147003 A1* | 6/2008 | Menzi ............... A61M 25/0618 604/110 |
| 2008/0243086 A1 | 10/2008 | Hager et al. |
| 2008/0249478 A1 | 10/2008 | Ishikura et al. |
| 2008/0300543 A1* | 12/2008 | Abriles ................ A61M 5/158 604/162 |
| 2009/0154824 A1* | 6/2009 | Rai .......................... G06T 5/20 382/260 |
| 2009/0182280 A1 | 7/2009 | Glowacki et al. |
| 2009/0259194 A1 | 10/2009 | Pinedjian |
| 2009/0281499 A1 | 11/2009 | Harding et al. |
| 2009/0312711 A1* | 12/2009 | Brimhall ........... A61M 25/0618 604/164.08 |
| 2010/0016804 A1 | 1/2010 | Muskatello |
| 2010/0049139 A1 | 2/2010 | Kiyono |
| 2010/0168675 A1 | 7/2010 | Cindrich et al. |
| 2010/0222746 A1 | 9/2010 | Burkholz |
| 2010/0222749 A1 | 9/2010 | Baid |
| 2010/0241087 A1 | 9/2010 | Moulton |
| 2011/0092915 A1* | 4/2011 | Olson ................ A61M 5/3287 604/198 |
| 2011/0213307 A1 | 9/2011 | Kawai et al. |
| 2011/0301551 A1 | 12/2011 | Koehler |
| 2012/0296282 A1 | 11/2012 | Koehler et al. |
| 2013/0150791 A1* | 6/2013 | Peterson ........... A61M 25/0606 604/164.04 |
| 2014/0031752 A1 | 1/2014 | Blanchard et al. |
| 2014/0039399 A1 | 2/2014 | Burkholz |
| 2014/0276433 A1 | 9/2014 | Woehr |
| 2014/0276453 A1 | 9/2014 | Woehr |
| 2014/0364809 A1 | 12/2014 | Isaacson et al. |
| 2015/0032058 A1 | 1/2015 | Karlsson |
| 2016/0135841 A1* | 5/2016 | Albert ............... A61M 25/0618 604/263 |
| 2016/0220791 A1* | 8/2016 | Akcay .................... A61M 21/02 |
| 2016/0331938 A1* | 11/2016 | Blanchard ......... A61M 25/0618 |
| 2017/0035992 A1* | 2/2017 | Harding ................ A61M 5/158 |
| 2017/0072183 A1 | 3/2017 | Hoang et al. |
| 2017/0296782 A1 | 10/2017 | Bornhoft et al. |
| 2018/0154119 A1 | 6/2018 | White et al. |
| 2018/0318557 A1* | 11/2018 | Burkholz .............. A61M 39/10 |
| 2019/0015599 A1* | 1/2019 | Takemoto ........... A61M 5/3245 |
| 2019/0314614 A1* | 10/2019 | Krause .............. A61M 25/0618 |
| 2020/0121895 A1* | 4/2020 | Akcay .............. A61M 25/0618 |
| 2020/0139088 A1* | 5/2020 | Baid ................. A61M 25/0637 |
| 2020/0146605 A1* | 5/2020 | Paliwoda ......... A61B 5/150732 |
| 2020/0188634 A1* | 6/2020 | Woehr .............. A61M 25/0625 |
| 2020/0230367 A1* | 7/2020 | Dalena ............. A61M 25/0097 |

FOREIGN PATENT DOCUMENTS

| | | | |
|---|---|---|---|
| CN | 101500637 | 8/2009 | |
| CN | 101543657 | 9/2009 | |
| EP | 367549 | 5/1990 | |
| EP | 0554841 | 8/1993 | |
| EP | 747085 | 12/1996 | |
| EP | 750916 | 1/1997 | |
| EP | 750916 A2 * | 1/1997 | ........ A61M 25/0618 |
| EP | 832666 | 4/1998 | |
| EP | 1378263 | 1/2004 | |
| EP | 1974765 | 10/2008 | |
| EP | 2133109 A1 | 12/2009 | |
| EP | 2343095 | 7/2011 | |
| EP | 2575946 | 4/2013 | |
| EP | 2745870 | 6/2014 | |
| EP | 3260157 A1 | 12/2017 | |
| JP | 07024071 A * | 1/1995 | ........ A61M 25/0606 |
| JP | H0724071 | 1/1995 | |
| JP | 2001190683 | 7/2001 | |
| JP | 2002210005 | 7/2002 | |

(56) References Cited

FOREIGN PATENT DOCUMENTS

| | | | | |
|---|---|---|---|---|
| JP | 2004-073403 | 3/2004 | | |
| JP | 2004113394 | 4/2004 | | |
| JP | 2004113523 | 4/2004 | | |
| JP | 2004113524 | 4/2004 | | |
| JP | 2004154364 | 6/2004 | | |
| JP | 2004321489 | 11/2004 | | |
| JP | 5808798 | 6/2013 | | |
| WO | 9008564 | 8/1990 | | |
| WO | 9325254 | 12/1993 | | |
| WO | 9908742 | 2/1999 | | |
| WO | 20006221 | 2/2000 | | |
| WO | 123028 | 4/2001 | | |
| WO | 200123029 | 4/2001 | | |
| WO | 2001068174 | 9/2001 | | |
| WO | 200193940 | 12/2001 | | |
| WO | 2003011381 | 2/2003 | | |
| WO | 3103757 | 12/2003 | | |
| WO | 2004000408 | 12/2003 | | |
| WO | 2004043521 | 5/2004 | | |
| WO | 200508736 | 9/2005 | | |
| WO | 2005087306 | 9/2005 | | |
| WO | 2006062983 | 6/2006 | | |
| WO | 2007018824 | 5/2007 | | |
| WO | WO-2007098355 A1 * | 8/2007 | ........ | A61M 25/0606 |
| WO | 2008021132 | 2/2008 | | |
| WO | 2008123297 A1 | 10/2008 | | |
| WO | 2009010847 | 1/2009 | | |
| WO | 2009139951 | 11/2009 | | |
| WO | 2009154824 | 12/2009 | | |
| WO | WO-2009154824 A1 * | 12/2009 | ........ | A61M 25/0618 |
| WO | 2010008784 | 1/2010 | | |
| WO | 2010038471 | 4/2010 | | |
| WO | 2010101740 | 9/2010 | | |
| WO | 2010127846 | 11/2010 | | |
| WO | 2011036574 | 3/2011 | | |
| WO | 2011152916 | 12/2011 | | |
| WO | 2006133138 A1 | 8/2016 | | |
| WO | 2018172985 A1 | 9/2018 | | |
| WO | WO-2018175573 A1 * | 9/2018 | ........ | A61M 25/0618 |

OTHER PUBLICATIONS

EUIPO; Extended European Search Report and Opinion for EP 06253995.2 mailed on Jan. 24, 2007 (6 pages).
ISA; International Search Report and Written Opinion received in counterpart International Patent Application PCT/US2009/048091 mailed Jan. 20, 2010 (9 pages).
EUIPO; European Patent Office extended European Search Report issued in Application No. 09798452.0 dated Feb. 7, 2013.
CNIPA; State Intellectual Property Office of the People's Republic of China Official Action issued in Application No. 2009801280721 dated Aug. 31, 2012.
CNIPA; State Intellectual Property Office of the People's Republic of China Official Action issued in Application No. 2009801280721 dated Dec. 9, 2013.
CIPO; Canadian Intellectual Property Office Official Action issued in Application No. 2723093 dated May 20, 2015.
AUIPO; IP Australia Examination Report issued in Application No. 2009271370 dated Feb. 21, 2013.
ISA; European Patent Office ISR/WO issued in International Application No. PCT/US2015/023519 dated Jul. 16, 2015.
USPTO; Non-Final Office Action dated Dec. 30, 2015 in U.S. Appl. No. 14/250,042.
USPTO; Notice of Allowance dated Jul. 8, 2016 in U.S. Appl. No. 14/250,042.
USPTO; Notice of Allowance dated Sep. 21, 2016 in U.S. Appl. No. 14/250,042.
USPTO; Restriction Requirement dated Jun. 15, 2018 in U.S. Appl. No. 15/383,271.
USPTO; Non-Final Office Action dated Sep. 19, 2018 in U.S. Appl. No. 15/383,271.
ISA; European Patent Office International Search Report issued in International Application No. PCT/US2011/028770 dated May 19, 2011.
ISA; European Patent Office International Preliminary Report on Patentability issued in International Application No. PCT/US2011/028770 dated Aug. 21, 2012.
AUIPO; Notice of Acceptance dated Apr. 28, 2016 in Australian Application No. 2011261837.
CIPO; Office Action dated Aug. 17, 2017 in Canadian Application No. 2,791,402.
CIPO; Office Action dated Jun. 5, 2018 in Canadian Application No. 2,791,402.
CIPO; Notice of Allowance dated Feb. 21, 2020 in Canadian Application No. 2,791,402.
EUIPO; Communication Under Rule 71(3) EPC dated Jun. 2, 2016 in European Application No. 14161101.2.
EUIPO; Extended European Search Report from the EPO in counterpart EP Application No. 14161101.2 dated Apr. 14, 2014 (9 pages).
JPO; Office Action issued in corresponding Japanese Application No. 2013-513163 dated Aug. 1, 2014 3 pages.
CNIPA; The Patent Office of the People's Republic of China Official Action issued in Application No. 201180020786.8 dated Sep. 4, 2014.
CNIPA; The Patent Office of the People's Republic of China Office Action issued in Application No. 201180020786.8 dated Apr. 3, 2015.
CNIPA; Office Action dated Nov. 24, 2017 in Chinese Application No. 201510696156.2.
USPTO; Non-Final Ofice Action dated Apr. 10, 2012 in U.S. Appl. No. 12/792,290.
USPTO; Notice of Allowance dated May 7, 2012 in U.S. Appl. No. 12/792,290.
USPTO; Office Action dated Sep. 18, 2013 in U.S. Appl. No. 13/564,396.
USPTO; Office Action dated Jun. 5, 2014 in U.S. Appl. No. 13/564,396.
USPTO; Final Office Action dated Nov. 21, 2014 in U.S. Appl. No. 13/564,396.
USPTO; Office Action dated Feb. 12, 2016 in U.S. Appl. No. 13/564,396.
USPTO; Notice of Allowance dated Jun. 6, 2016 in U.S. Appl. No. 13/564,396.
USPTO; Notice of Allowance dated Sep. 21, 2016 in U.S. Appl. No. 13/564,396.
USPTO; Non-Final Office Action dated Jun. 4, 2018 in U.S. Appl. No. 15/383,217.
USPTO; Final Office Action dated Dec. 3, 2018 in U.S. Appl. No. 15/383,217.
USPTO; Notice of Allowance dated Feb. 25, 2019 in U.S. Appl. No. 15/383,217.
ISA; International Search Report and Written Opinion dated Jul. 17, 2020 in Application No. PCT/US2020/029280.
Examination Report No. 1 for AU Application No. 2020263310 dated Mar. 21, 2022.
Examination Report No. 1 for CN Application No. 2020800100959 dated Aug. 23, 2022 .
EP Extended Search Report for counterpart EP application No. 20793553.7 dated Jan. 23, 2023.
Japanese office action for counterpart Japanese application No. 2021-541272 dated Oct. 27, 2022 including Goggle translation.
JP2021-541272 office action dated May 1, 2023.
Office action dated Sep. 26, 2023 for U.S. Appl. No. 17/514,438.

* cited by examiner

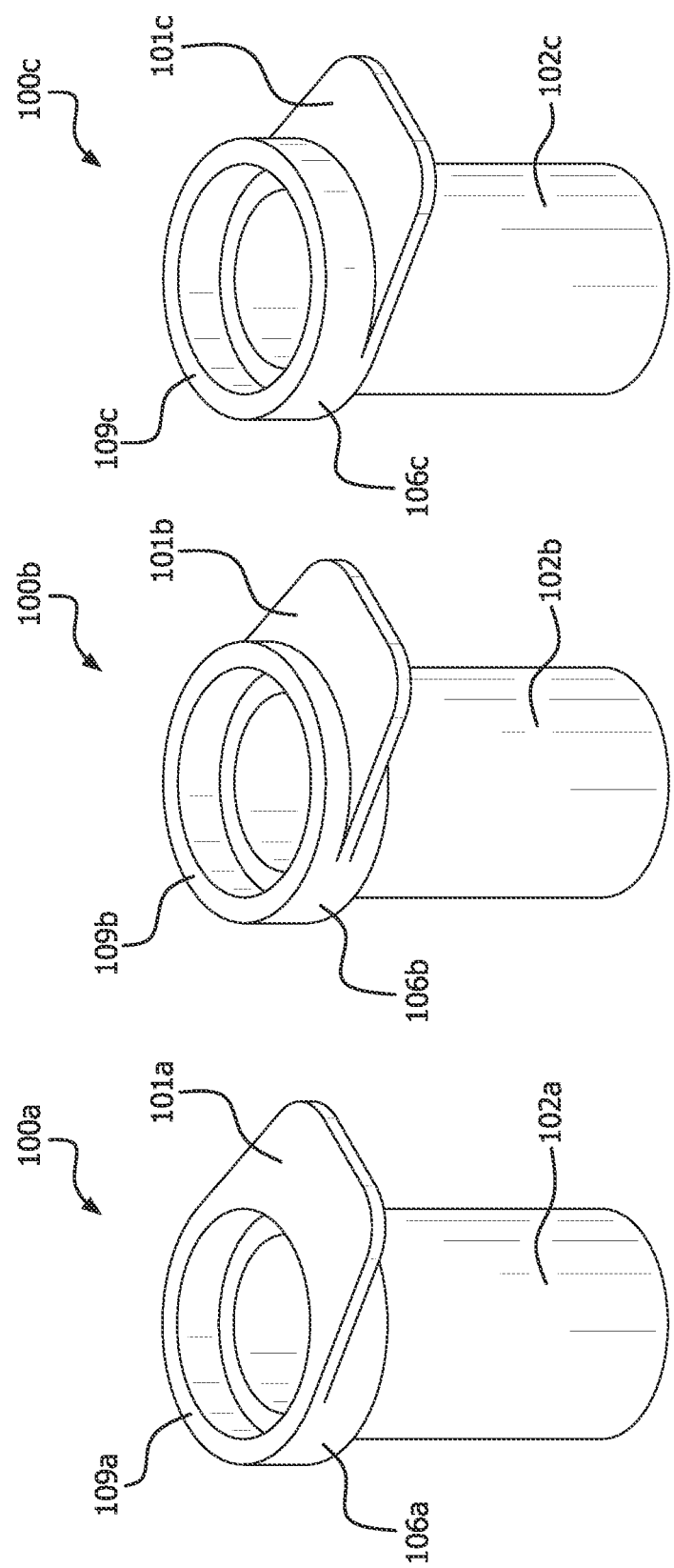

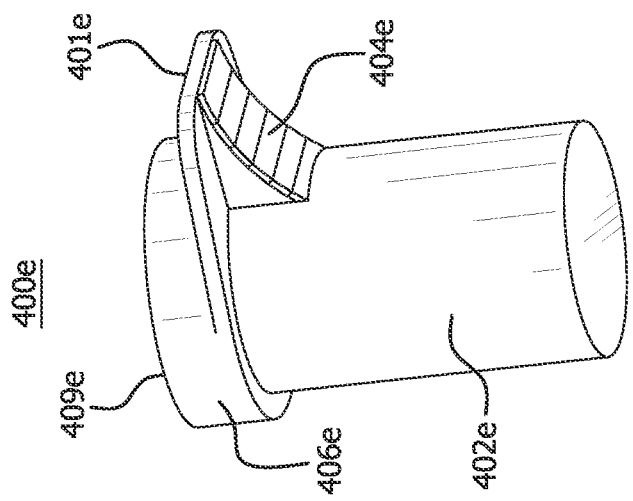

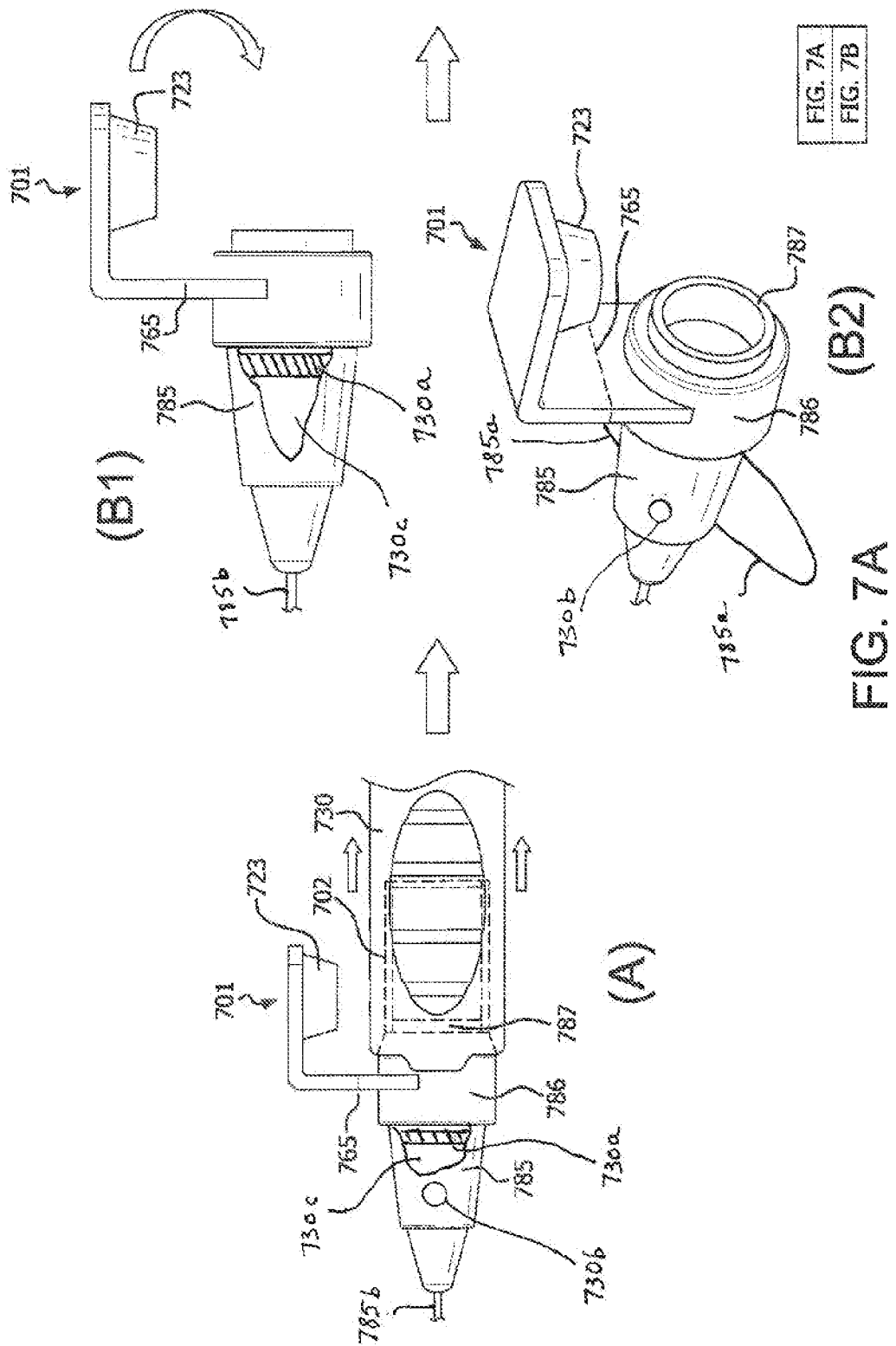

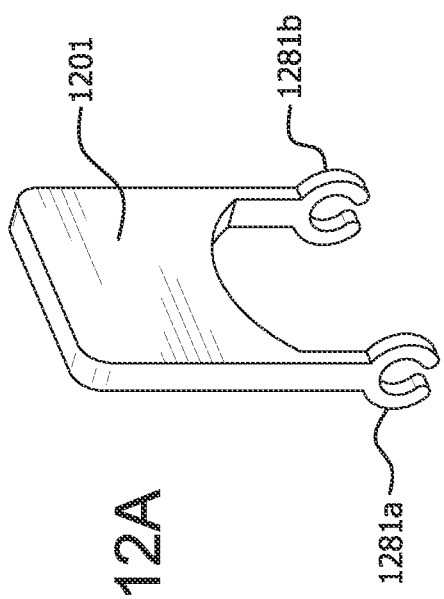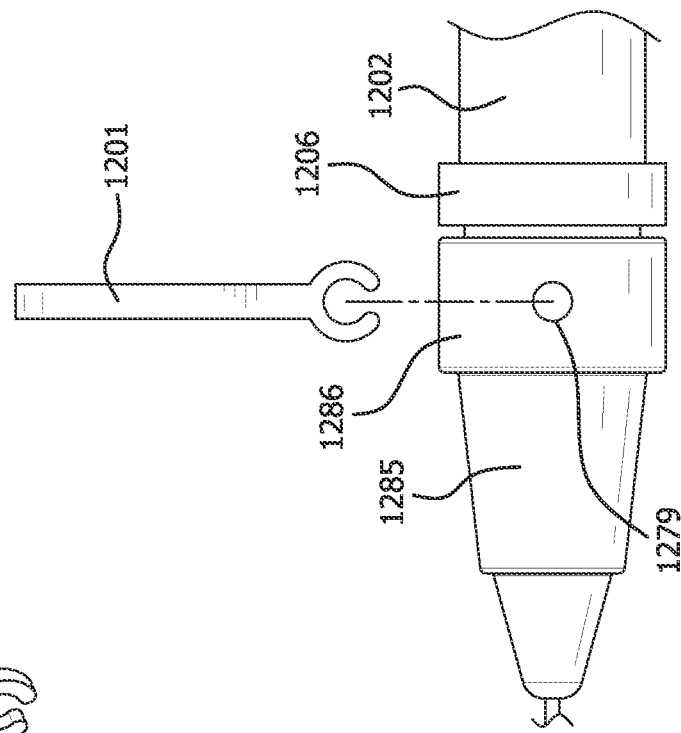

CATHETER INSERTION DEVICE WITH IMPROVED PUSH TAB AND TIP PROTECTOR ASSEMBLY

CROSS-REFERENCE TO RELATED APPLICATIONS

This application claims priority to and the benefit of U.S. Provisional Patent Application Ser. No. 62/837,648 filed Apr. 23, 2019 and entitled "CATHETER INSERTION DEVICE WITH IMPROVED PUSH TAB AND TIP PROTECTOR ASSEMBLY," the disclosure of which is incorporated herein by reference in its entirety for all purposes.

FIELD

This disclosure generally relates to medical devices, and more specifically, to peripheral intravenous catheters configured for one-handed operation.

BACKGROUND

Peripheral intravenous (IV) catheters (PIVCs) are one of the most widely used medical devices for hospitalized patients. They are principally used to provide a port into the patient's cardiovascular system that can be used to administer fluids or take blood samples. A central feature to a PIVC is the hollow plastic catheter tube that is threaded over an introducer needle, in response to the PIVC being in a ready-to-use configuration. The placement of the PIVC into the patient's vasculature involves the insertion of the introducer needle into the vessel, the insertion of the catheter tube into the vessel, and removal of the introducer needle.

However, such a seemingly straightforward procedure is often fraught with difficulties. For example, accidental needle sticks can happen when the introducer needle is withdrawn. Further, a medical practitioner is often only able to use one hand when placing the PIVC. Some PIVCs are not configured to address these and other issues relating to PIVC placement and securement. As such, there is a continued need for improvements to address common challenges related to IV insertion.

SUMMARY

In various embodiments, features are configured on PIVCs to better facilitate one-handed placement. The features include more robust upstanding tab configurations, hinging tabs, flexible interface between catheter hub and tip protector assembly (TPA), viewing window in a TPA to provide confirmation of needle protection, and/or color indicators.

In various embodiments, a tip protector assembly for use in an I.V. catheter comprises: a tubular housing having an outer surface, a proximal end portion having a proximal opening, a distal end portion having a distal opening, and an interior space defining a central axis therethrough; a needle guard contained within the interior of the tubular housing, the needle guard configured to capture a sharp distal tip of a needle axially slidable through the tubular housing and through the needle guard along the central axis; and a push tab connected on the distal end portion of the tubular housing and comprising a distal face and a proximal face, the push tab extending radially from the outer surface of the tubular housing at an angle to the central axis.

In various embodiments, the angle is about 900 such that the distal face of the push tab is flush with the distal opening of the tubular housing.

In various embodiments, the angle is from about 20° to about 90°. As the angle is lessened (i.e., the flat push tab becomes closer to parallel with the tubular housing of the TPA), an operator may engage an edge of the push tab rather than a proximal face of the push tab when placing the catheter assembly in a patient. Exemplary angles for a push tab are illustrated in FIGS. 3A and 3B, recognizing that the angles marked are relative to the distal opening of the tubular housing.

In various embodiments, the tip protector assembly may further comprise an alignment feature extending distally from the distal opening of the tubular housing, the alignment feature dimensionally configured to rotationally index the tip protector assembly to a catheter hub, such as illustrated in FIGS. 2A-2C. In various embodiments, a tip protector housing may comprise only an alignment feature and no push tab, such as illustrated in FIG. 2D. For such a configuration, a push tab may instead be provided on a catheter hub.

In various embodiments, the push tab further comprises a rolled edge along an edge of the push tab opposite the tubular housing, the rolled edge disposed substantially orthogonal to the central axis, such as illustrated in FIG. 5A.

In various embodiments, the push tab further comprises a curved or angular portion opposite the tubular housing, the curved or angular portion extending proximally from the proximal face of the push tab, such as illustrated in FIGS. 5B and 5C.

In various embodiments, the push tab radially tapers from the tubular housing to an edge opposite the tubular housing, the push tab connected to the tubular housing at two locations such that the push tab includes an open fenestration between the two locations, such as illustrated in FIG. 5D.

In various embodiments, the push tab further comprises at least one brace connected to the outer surface of the tubular housing and at least one of the distal face or the proximal face of the push tab, such as illustrated in FIGS. 4A-4E.

In various embodiments, the push tab further comprises a distally extending portion configured parallel to the outer surface of the tubular housing, intervening between the tubular housing and the radially extending push tab such that the entirety of the push tab comprises a stepped structure projecting distally beyond the distal opening of the tubular housing. An exemplary embodiment is illustrated in FIG. 5E.

In various embodiments, the push tab further comprises two non-parallel surfaces such that the push tab forms an arrow configuration pointing distally, such as illustrated in FIG. 6.

In various embodiments, the tip protector assembly further comprises a radially configured aperture through the tubular housing, dimensionally arranged to expose the needle guard to visual inspection from an environment outside the tip protector assembly.

In various embodiments, a catheter hub for use in an I.V. catheter comprises: a housing having an outer surface and an interior space defining an axial lumen extending therethrough, a proximal end portion comprising a proximal fitting at a proximal open end, and a distal end portion comprising a catheter tube extending distally from the distal end portion of the housing, wherein the proximal open end and the catheter tube are fluidically connected by the axial lumen; and a hinging push tab connected to the outer surface of the housing at the proximal end portion, the hinging push tab comprising a radially projecting portion connecting a proximally extending portion of the hinging push tab to the outer surface of the housing, the hinging push tab comprising a resilient portion disposed on the proximally extending portion and a hinge on the radially projecting portion, wherein the hinging push tab is rotatable through the hinge between a ready-to-use position and a safety position, wherein in the ready-to-use position the hinging push tab is rotatable toward the proximal fitting of the housing, and wherein in the safety position the hinging push tab is coupled to the proximal fitting of the housing to reduce an overall height of the catheter hub.

In various embodiments, the catheter hub may further comprise a sealing element preventing fluid flow out of the proximal open end. In various embodiments, the sealing element comprises an elastomeric septum that seals after an introducer needle has been fully withdrawn from it.

In various embodiments, the coupling between the hinging push tab and the proximal fitting of the housing comprises a fluid-tight seal between the resilient portion of the hinging push tab and the proximal fitting of the housing in the safety position.

In various embodiments, a tip protector assembly for use in an I.V. catheter comprises: a tubular housing having an outer surface, a proximal end portion having a proximal opening, a distal end portion having a distal opening, and an interior space defining a central axis therethrough, wherein the proximal end portion and the distal end portion connect through a coaxially aligned and contiguous flexible tubing segment; and a needle guard contained within the interior of the tubular housing, the needle guard configured to capture a sharp distal tip of a needle axially slidable through the tubular housing and through the needle guard along the central axis, wherein the flexible tubing segment is configured to allow off-axis pivoting between the proximal end portion and the distal end portion of the tubular housing when the proximal end portion is fixedly coupled to a proximal fitment of a catheter hub.

In various embodiments, the tip protector assembly further comprises a push tab connected on the distal end portion of the tubular housing and comprising a distal face and a proximal face, the push tab extending radially from the outer surface of the tubular housing at an angle to the central axis.

In various embodiments, a tip protector assembly for use in an I.V. catheter comprises an outer tubular sleeve comprising a proximal end portion having a proximal opening, and a distal end portion having a distal opening and a central axis therethrough; an inner tubular sleeve nested and axially slidable within the outer tubular sleeve between a first position and a second position relative to the outer tubular sleeve, the inner tubular sleeve comprising an outer surface, a proximal end portion having a proximal wall, a distal end portion having a distal opening, and an interior surface defining an interior space therein; a needle guard contained within the interior space of the inner tubular sleeve, the needle guard configured to capture a sharp distal tip of a needle axially slidable through the nested inner and outer tubular sleeves and through the needle guard along the central axis; and at least one indicia disposed on the outer surface of the inner tubular sleeve, wherein in the first position the indicia is obscured by the outer tubular sleeve and wherein in the second position the indicia is not obscured by the outer tubular sleeve and is viewable by an observer. Various non-limiting embodiments are illustrated in FIGS. 10A-10B.

In various embodiments, the tip protector assembly may further comprise an aperture configured radially in the outer tubular sleeve through to the outer surface of the inner tubular sleeve such that the indicia is viewable through the aperture when the inner tubular sleeve is in the second position, such as illustrated in FIGS. 11A-11B.

In various embodiments, a catheter hub for use in an I.V. catheter comprises: a housing having an outer surface and an interior space defining an axial lumen extending therethrough, a proximal end portion comprising a proximal fitting at a proximal open end, and a distal end portion comprising a catheter tube extending distally from the distal end portion of the housing, wherein the proximal open end and the catheter tube are fluidically connected by the axial lumen; two cylindrical posts extending radially and in opposite directions from the proximal end portion of the housing, the two posts positioned 180° apart from one another; and a removable push tab comprising an upstanding portion having a proximal face and a distal face and two parallel arms, each arm reversibly engaged to each of the two posts, the upstanding portion straddling the proximal end portion of the housing and projecting radially therefrom, wherein the catheter hub is convertible from a placement configuration with the arms of the removable push tab engaged on the posts to a placed configuration with the arms of the removable push tab disengaged from the posts.

In various embodiments, the removable push tab further comprises a space configured between the proximal and distal faces such that the upstanding portion comprises a proximal portion and a distal portion that are moveable toward each other to disengage both arms from the two posts. An exemplary embodiment is illustrated in FIG. 12D.

BRIEF DESCRIPTION OF THE DRAWING FIGURES

The subject matter is pointed out with particularity and claimed distinctly in the concluding portion of the specification. A more complete understanding, however, may best be obtained by referring to the detailed description and claims when considered in connection with the following drawing figures:

FIGS. 1A-1C illustrate various embodiments of push tab configurations on TPA housings that facilitate one-handed PIVC operation, in accordance with various embodiments;

FIGS. 4A-4E illustrate various embodiments of TPA housing configurations wherein a push tab configured on the TPA housing is structurally strengthened by the presence of at least one brace connecting the body of the TPA housing to a proximal and/or distal face of the push tab, in accordance with various embodiments;

FIGS. 7A and 7B illustrate a hinging push tab and method of use thereof that begins in an upright position for threading (FIG. 7A) and ends in a flipped-down position (FIG. 7B) once the introducer needle is fully withdrawn from the catheter hub, in accordance with various embodiments;

FIGS. 12A-12D illustrate various embodiments of a removable push tab configured on a catheter hub and method of use thereof.

DETAILED DESCRIPTION

Figures 2A, 2B:
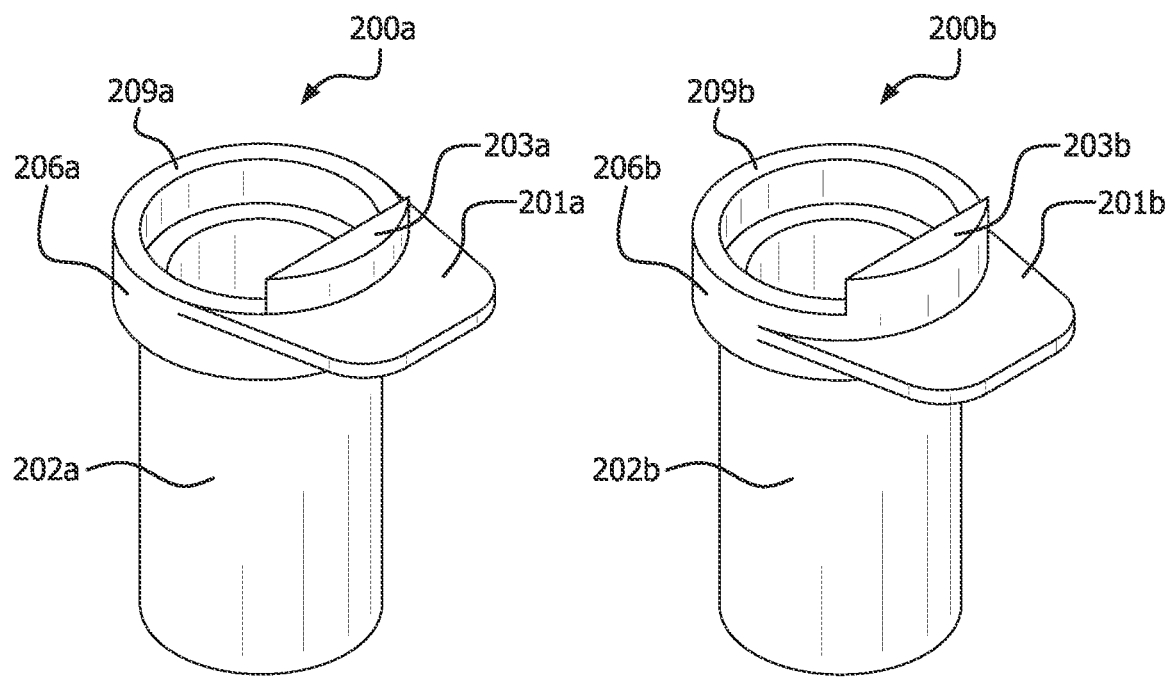
FIGS. 2A-2D illustrate various embodiments of TPA housing configurations comprising an alignment feature used to rotationally index the TPA housing to a catheter hub, in accordance with various embodiments.
Figures 2C, 2D:
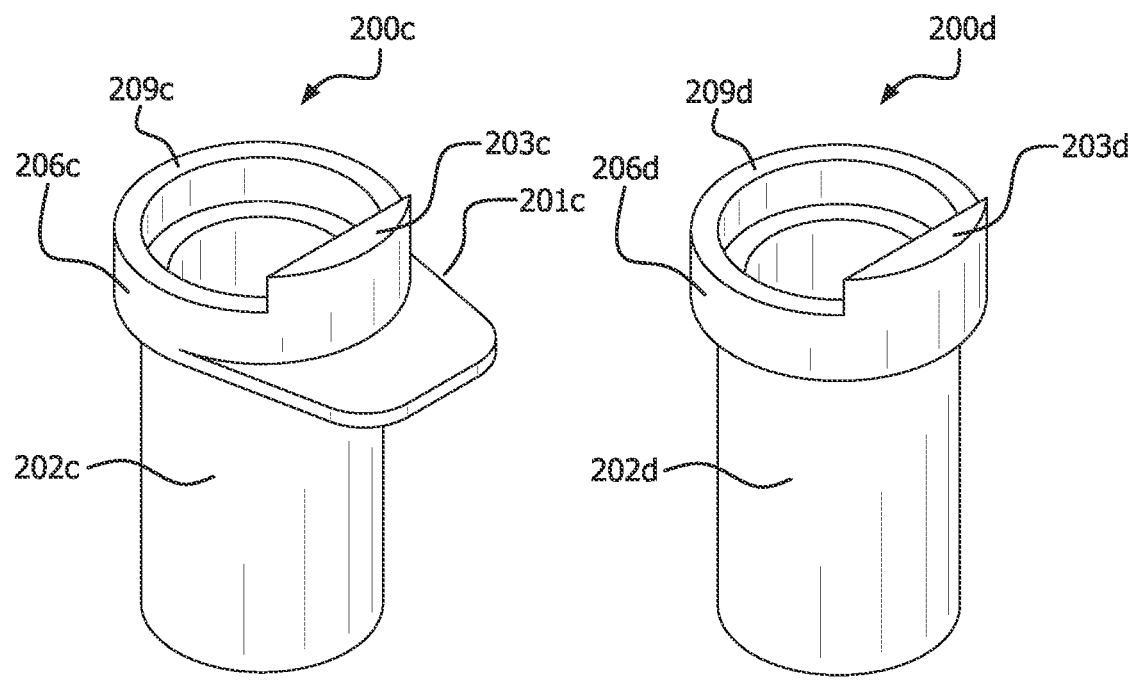

The detailed description of various embodiments herein references the accompanying drawings, which show various embodiments by way of illustration. While these various embodiments are described in sufficient detail to enable those skilled in the art to practice the disclosure, it should be understood that other embodiments may be realized, and that logical, chemical, mechanical and structural changes may be made without departing from the spirit and scope of the disclosure. Thus, the detailed description herein is presented for purposes of illustration only and not of limitation.

Definitions and Conventions

As used herein, the term "proximal" refers to a location of a portion of a device or an end of a device closest to a user of the device. Consequently, the term "distal" refers to a location of a portion of a device or an end of a device furthest from a user of the device. For example, a hypodermic syringe has a sharp needle tip at its distal end and a plunger at its proximal end. The terms are also associated with direction, movement and relative positioning, whereby "proximally" generally refers to movement or relative positioning closer to the user and "distally" generally refers to movement or relative positioning further away from the user.

As used herein, the term "catheter assembly" refers to a medical device comprising: a catheter hub having a fluidic central bore therethrough from a proximal end to a distal end, a catheter tube extending distally from the distal end of the catheter hub, a resealable resilient septum positioned in the central bore, and an optional side port in fluidic communication with the central bore; and a needle hub having an introducer needle extending distally from a distal end of the needle hub and coaxially movable through the septum and inside the catheter tube, the introducer needle providing a fluidic cannula from a distal sharp tip into the needle hub, the needle hub optionally having a proximal end configured with a flash chamber to observe blood flashback. A "safety catheter" further comprises a "tip protector assembly," defined below, configured to capture the sharp distal tip of the introducer needle when the needle is withdrawn out from the catheter tube and catheter hub. Without a tip protector assembly, the sharp distal tip of the introducer needle would be left entirely exposed once the tip of the needle emerges from the proximal end of the catheter hub upon withdrawal of the needle. A catheter assembly is used to provide a port into the vasculature of a patient, with the catheter tube providing the fluidic connection from the patient's vessel to the catheter hub, with the introducer needle entirely withdrawn from the assembly. The septum in the catheter hub seals upon withdrawal of the introducer needle, leaving only the side port of the catheter hub for access to the patient's vasculature.

As used herein, the TPA (tip protector assembly) is a "safety mechanism" configured in a catheter assembly to prevent accidental needle sticks when the introducer needle is fully withdrawn from the catheter assembly at the end of the placement of the PIVC. In various embodiments herein, a TPA comprises an exterior housing having a tubular shape and a hollow interior. The housing is sized to suitably enclose a mechanical needle guard further comprising at least one moveable arm or another movable element that moves to cover the sharp tip of the introducer needle as the needle is withdrawn through the TPA. In various embodiments, the needle guard might provide an audible "click" when the mechanism captures the sharp distal tip of the introducer needle, although an audible feature often relies on the present of metal-on-metal events within the TPA. The TPA may also be configured to prevent movement of the introducer needle in any direction once the sharp tip is captured by the needle guard portion of the TPA.

The tubular housing portion of the TPA encloses the needle guard mechanism. In various embodiments, the tubular housing of the TPA ("TPA housing") is configured with one or more structural features, such as on an exterior surface, to facilitate one-handed operation of the PIVC and/or to promote safety while placing the PIVC in the vasculature of a patient. In various embodiments, a TPA housing may be made of a molded plastic, and the features in accordance with various embodiments may be configured on the exterior surface, such as protruding therefrom, or through the wall of the tubular structure, such as in the case of a viewing window into the interior space of the TPA housing. To help orientate and reference the relative positioning of various features on a TPA housing, a TPA housing is generally shaped as a straight cylinder comprising an exterior surface and an interior surface that defines a hollow interior where the needle guard mechanism resides. In use, the TPA housing is oriented along a proximal-distal axis in the PIVC that runs through the catheter hub, the catheter tube and the introducer needle, with the introducer needle of the PIVC arranged and axially movable on this axis. In various embodiments, the tubular housing is about 10-15 mm in length and about 5-7 mm in diameter, although these dimensions are not meant to be limiting. Although the TPA housing may be generally cylindrical in appearance, there may be one or more step changes in its exterior and/or interior diameter to accommodate fitting to the proximal end of a catheter hub, or to accommodate some of the structural features disclosed herein. In general embodiments, the distal end of a TPA housing is configured with a collar portion providing a larger interior diameter that can reversibly snap fit onto the proximal end of the catheter hub of the PIVC. In various embodiments, certain structural features may be configured on the exterior surface of this collar. In various embodiments, certain structural features may be configured through the wall thickness of the TPA housing, such as to facilitate viewing into the interior of the TPA housing and in particular, to view the status of the guard mechanism housed therein.

As used herein, the term "push tab" refers to an upstanding feature configured on either the TPA housing or on the catheter hub to facilitate one-handed PIVC operation. A push tab may be of various sizes and shapes, such as to fit the size and shape of a practitioner's thumb or finger, and the upstanding push tab may be hinging or fixed, permanently attached or removable, or have other functional attributes in accordance with various embodiments. In general, a push tab is configured to radially project outward from either a TPA housing or a catheter hub, meaning a push tab herein will comprise a generally planar portion that is orthogonal to the proximal-distal axis of the PIVC.

The terms "insertion," "placement," and "threading" refer to steps involved in connecting a catheter to a patient's vasculature. Insertion generally refers to the tapping of a patient's blood vessel with the introducer needle portion of the catheter assembly, while the term placement is generally used to reference the entire procedure of connecting a catheter to a patient. Threading refers to the insertion of the catheter tube into the patient's vessel once the introducer needle has been used to locate and tap the vessel. The term threading is used because of the relative movement of the introducer needle and the catheter tube, which as mentioned, are axially nested with the introducer needle being "threaded" inside the catheter tube. In general, threading is the combination of distal movement of the catheter tube into the vessel and proximal movement of the introducer needle out from the vessel, i.e., the exchange of one for the other, which involves axially shifting the catheter tube and the introducer needle relative to one another. To move the catheter tube distally, it is the catheter hub that is pushed by the operator since the catheter tube is fixed to the distal end of the catheter hub and the two do not move separate from each other. Further, to move the introducer needle proximally, it is normally the needle hub that is gripped and pulled proximally since the introducer needle and the needle hub are fixed to one another and cannot move independently. Ideally, threading is a two-handed procedure, but this is often not the case for various practical reasons, such as the practitioner using one hand in a tourniquet procedure.

The embodiments described herein address, for example, three primary challenges relating to IV catheters and their placement in a patient's vasculature:

1. To facilitate one-handed techniques during insertion and threading the catheter;
2. To enhance the usability of and confidence in the safety mechanism of the TPA within noisy and/or stressful environments where an audible indicia is not practical or configured; and
3. To minimize the height of the catheter hub to prevent tenting or tearing of dressing materials that may be used over the assembly, such as to adhere the catheter hub to the patient.

Various embodiments may provide functional design options for a safety catheter that can be made without a latch or locking mechanism to release the catheter hub, which reduces cost and complexity. Various embodiments maximize ease of use by providing a large push tab at the time of insertion and threading but minimize the catheter height after placement to facilitate dressing, prevent damaging the dressing, and minimize dead space under the dressing that can lead to contamination. Various embodiments also describe visual indicia relating to relative positioning between the sharp tip of the introducer needle and the internal safety mechanism of the TPA to enhance the safety of the product and the confidence of clinicians that the safety features of the TPA have engaged.

The various embodiments described herein are intended for closed system catheters but may apply to any IV catheter that includes a catheter hub that interfaces with a needle-stick safety mechanism, also referred to as a tip protector assembly (TPA). The various embodiments can be divided into 5 categories: (1) TPA push tab functional designs, (2) a hinged push tab, (3) a segmented TPA, (4) a TPA with various visual lock indicators, and (5) a removable push tab.

In accordance with various embodiments, a tip protector assembly (TPA) further comprises a needle guard, and may comprise arms that move radially to close over the sharp tip of the needle when the tip of the needle is pulled into the TPA. As mentioned, a TPA comprises a housing that may further comprise a distally extending alignment feature, or a collar, configured to extend over the proximal end of the catheter hub. This feature maintains axial alignment between the catheter hub and the TPA during insertion, resists bending or flexing at the interface between the TPA and catheter hub, and prevents the premature release of the TPA assembly from the catheter hub due to off-axis loading. The TPA with a collar snap-fitting over or into the proximal end of the catheter hub may maximize the strength of the interface between the hub and the TPA, without requiring a dedicated locking mechanism, and thereby reducing the manufacturing cost of the PIVC. This collar may also include a flat relief portion, or other keying feature, to provide rotational alignment with the catheter hub.

FIGS. 1-6 provide top perspective view embodiments of TPA housings having various push tab functional designs. Such embodiments with upstanding push tabs optimize handling and ease of use or the PIVC in general. In these examples, the upstanding tab portion is configured on the exterior surface of the TPA housing, radiating orthogonally from the tubular housing from a distal collar portion of the TPA housing.

In each of the illustrated embodiments, the top circular opening where a push tab might be located is the distal opening of the TPA housing (i.e., the female portion of the snap-fit arrangement mentioned above) configured to fit onto the proximal end of the catheter hub of the PIVC (i.e., the male portion). In various embodiments, the distal female end of the TPA housing may comprise a collar portion having larger diameter than the remainder of the tubular housing to accommodate fitting onto the catheter hub, although in some embodiments the exterior diameter of the TPA housing may be constant. In various embodiments, the parts are reversed in that the proximal end of the catheter hub may comprise the female portion of the connection and the distal end of the TPA housing may comprise the male portion.

With specific reference now to FIGS. 1A-1C, the TPA housings 100a, 100b and 100c each incorporate a push tab 101a, 101b and 101c, respectively, radially extending from the TPA housing 102a, 102b, 102c, and specifically attached to the distal collar 106a, 106b, 106c, respectively.

FIG. 1A illustrates an embodiment of a TPA housing 100a wherein the push tab 101a is located on the distal collar 106a and positioned directly at the distal edge of the TPA housing 102a such that the distal face of the push tab 101a is coplanar and flush with the distal circumferential opening 109a of the TPA housing 102a. In various embodiments, the upstanding push tab 101a may be in any radial position around the circumference of the TPA housing 102a, recognizing that the TPA housing 100a can be indexed to the catheter hub with various tab and notch configurations such that it is locked in a particular rotational conformation and prevented from rotating on the proximal end of the catheter hub. The push tab 101a may be positioned at the 12'O Clock position, or positioned, off-center, for example between 9-3 or 10-2 on the clock face, to facilitate various hand positions of the user. These clock directions can be viewed in reference to a planar surface defined by the wings typically radiating in opposite directions from the catheter hub that can be used to fasten the PIVC to a patient's arm after placement. Thus "12'O Clock position" refers to orthogonal to the plane defined by the wings of the catheter hub, for example wings 785a shown in (B2) of FIG. 7A, and thus in use, the push tab at 12' O Clock would be upstanding vertically from the plane defined by the wings. In various embodiments, the push tab 101a may be narrow or wide relative to the exterior diameter of the TPA housing. Further, there may be more than one push tab 101a located radially around the exterior circumference of the TPA housing. The one or more push tabs may be positioned on the collar 106a such as shown, or on the narrower diameter portion of the TPA housing 102a.

With reference now to FIGS. 1B and 1C, the push tabs 101b and 101c, respectively, can be proximally spaced away from the distal opening of the TPA housing rather than flush with the opening. FIG. 1B illustrates an embodiment 100b wherein the push tab 101b is proximally distanced from the distal opening 109b of the TPA housing 102b, but still attached to the collar 106b portion of the housing 102b. FIG. 1C illustrates an example 100c wherein the push tab 101c is proximally distanced even further away from the distal opening 109c of the TPA housing 102c, such as to the proximal end of the collar 106c of the TPA housing 102 as shown. In various embodiments, the push tab can be attached at any position axially along the exterior of the TPA housing, such as on the distal half of the housing length rather than on the proximal half.

FIGS. 2A-2D illustrate four functional design embodiments wherein TPA housing 202a, 202b, 202c and 202d, may further comprise an alignment feature. The alignment feature is indicated as 203a, 203b, 203c and 203d respectively, and each of these alignment features are shown molded in as a contiguous part of the collar portions 206a, 206b, 206c, and 206d of the TPA housing. The alignment feature provides additional resistance to off-axis loading during insertion and threading, to provide rotational alignment with the catheter hub, and to reduce bending at the interface between catheter hub and TPA housing. As shown, the first three functional designs 200a, 200b and 200c further include a radially extending push tab 201a, 201b and 201c, respectively. In various embodiments, an alignment feature such as 203a, 203b, 203c and 203d may be dimensionally configured to fit within a complementary notch configured at the proximal end of the catheter hub. In this way, an alignment feature can dock into the notch in the catheter hub. The alignment feature, such as illustrated in FIGS. 2A-2D, can be provided on the TPA housing in addition to the same type of tab/notch configuration that can be used to index the distal end of the needle hub into the proximal end of the catheter hub. In other words, the indexing of TPA housing to catheter hub can be mutually independent from the indexing of the needle hub to the catheter hub, recognizing that in various embodiments, a portion of the needle hub may entirely cover the TPA housing when both the needle hub and the TPA housing are docked on the proximal end of the catheter hub.

Figure 3A:
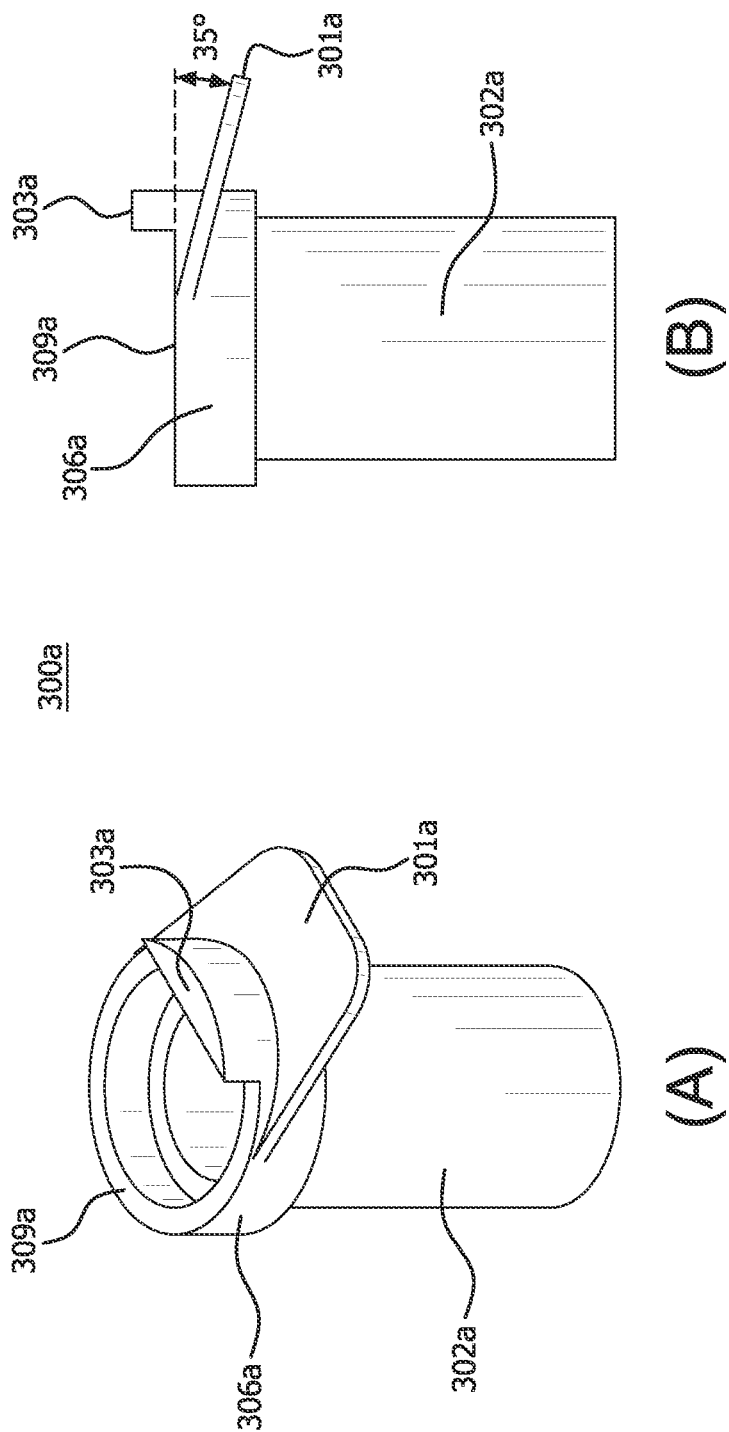
FIGS. 3A and 3B illustrate various embodiments of proximally angled push tab configurations on TPA housings that facilitate one-handed PIVC operation, in accordance with various embodiments.
Figure 3B:
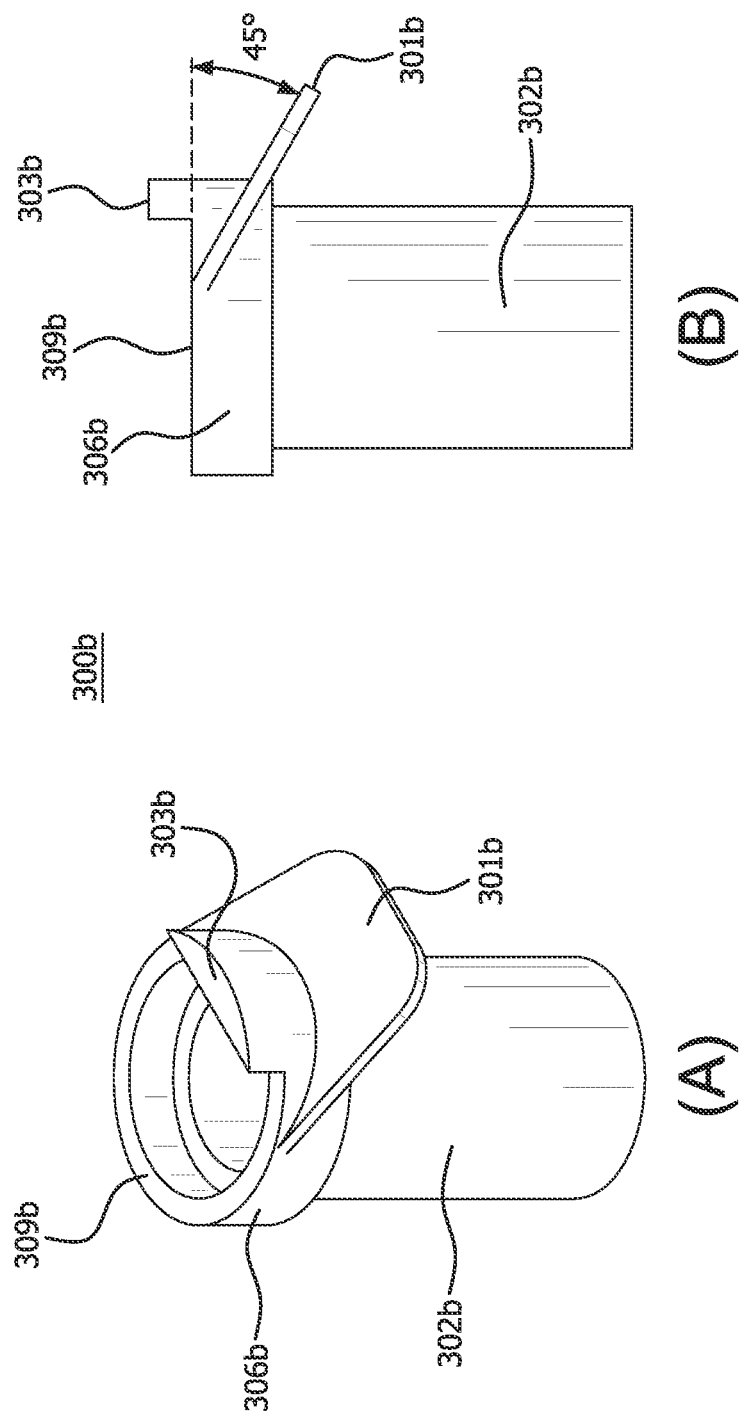

FIGS. 3A and 3B illustrate that the push tab, or a segment thereof, may be extended, or angled, proximally to enhance user control when threading is conducted with one hand. For example, FIG. 3A illustrates perspective (A) and side plan (B) views of a TPA housing embodiment 300a wherein the push tab 301a radiates from the collar 306a of the TPA housing 302a at an angle of about 350 from a plane defined by the distal edge 309a rather than flush from this opening. FIG. 3B illustrates perspective (A) and side plan (B) views of a TPA housing embodiment 300b wherein the push tab 301b radiates from the collar 306b of the TPA housing 302b at an angle of about 45° from a plane defined by the distal edge 309b rather than flush from this opening. In various embodiments, the angle between the push tab and a plane defined by the distal edge 309 the TPA housing 302 can be between about 0° to about 70°. Viewed another way, the angle between the push tab and a central axis running through the cylindrical TPA housing may be from about 20° to about 90°. At 90° from the cylindrical central axis, the push tab is radially projecting, such as in FIGS. 1-2. At various angles, a user's finger may engage the proximal edge of the angled push tab rather than the proximal face of the push tab. Both embodiments 300a and 300b further comprise the optional alignment feature 303a and 303b, respectively, usable to index the TPA housing to the catheter hub at a fixed rotational position.

Figure 4A:
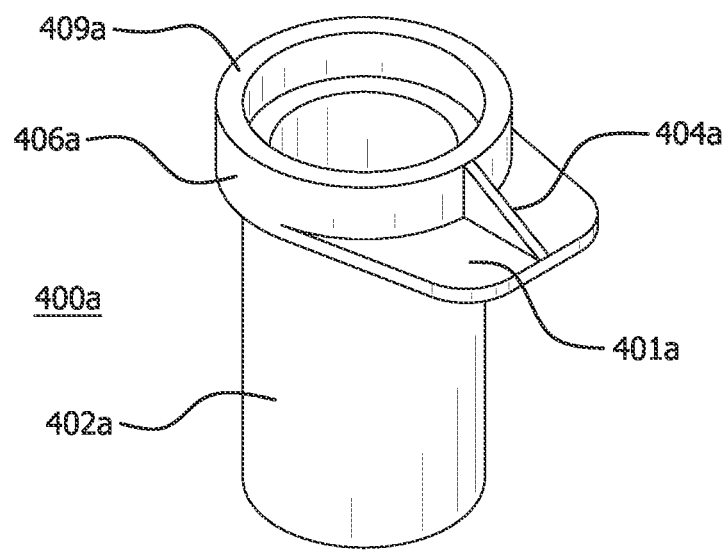
Figure 4B:
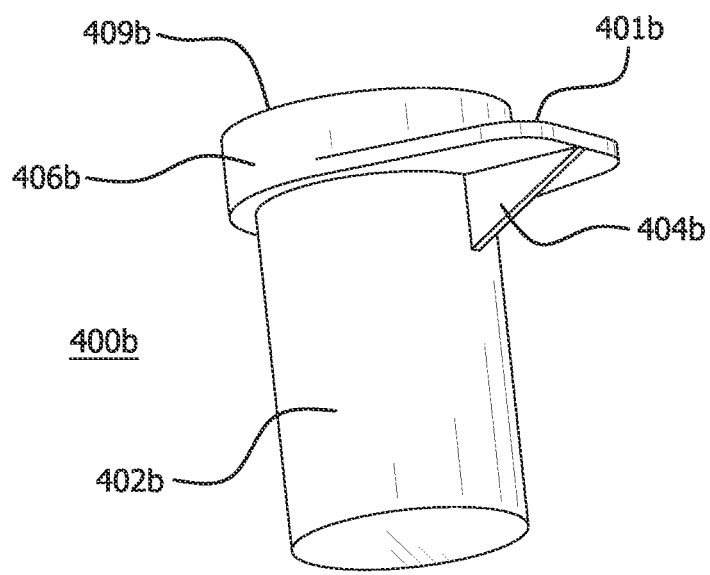

FIGS. 4A and 4B illustrate that the push tab may further comprise one or more supports or "braces" in contact with both the exterior surface of the TPA housing or the collar portion of the TPA housing and the push tab. In various embodiments, one or more braces may be configured on either (or both) the proximal and distal faces of the push tab. In various embodiments, the brace may take the physical form of a smooth "fillet," or may be configured more angular, even triangular, like a brace used in construction. In various embodiments, a brace may be contiguous with the other surfaces in that the entire TPA housing including the push tab and braces structures may be molded as a single plastic part, such as by injection molding.

FIG. 4A illustrates an embodiment of a TPA housing 400a wherein the upstanding push tab 401a is supported by a single triangular brace 404a disposed on the distal face of the push tab 401a, approximately centered across the width of the push tab 401a and contacting both the push tab 401a and the collar 406a of the TPA housing 402a. This particular configuration is not meant to be limiting. For example, the brace 404a need not extend distally to end distally at precisely the distal edge 409a of the TPA housing 402a as shown. FIG. 4B illustrates an embodiment of a TPA housing 400b wherein the upstanding push tab 401b is supported by a single triangular support 404b disposed on the proximal face of the push tab 401b. In various embodiments, one or more braces on the distal face and/or the proximal face of the push tab can serve to strengthen the push tab and prevent the push tab from bending under stress. In various embodiments, one or more braces oriented on the proximal face of the push tab may be dimensioned and/or contoured in ways to conform the brace(s) to the shape of a digit of a person and/or to be comfortably pushed by the thumb or other digit of the practitioner. In various embodiments, a brace on the distal face of the push tab may be configured to be more angular, such as to discourage engagement on the distal face of the push tab, whereas a brace on the proximal face of the push tab may be configured with a contour that can be engaged by a finger of a user.

FIGS. 4C, 4D and 4E illustrate variations in the geometry of the one or more braces 404. These functional designs are not intended to be limited by the particular examples illustrated. The one or more supports may be triangular, or curved/sloped to provide a finger rest. The brace, particularly when disposed on the proximal face of the push tab, may include ridges, grooves, steps, bumps, or a textured surface to enhance grip between the push tab and a user's finger, in situations with or without the user wearing medical gloves. As illustrated in TPA housing embodiment 400c in FIG. 4C, there may be two triangular braces 404c configured on the proximal face of the push tab 401c. As illustrated in TPA housing embodiment 400d in FIG. 4D, two contoured braces 404d may be configured on the proximal face of the push tab 401d, wherein the contour provides a fit to a user's finger. As illustrated in TPA housing embodiment 400e in FIG. 4E, the brace 404e may comprise a single wider contour in the shape of a slope or slide. In FIG. 4E, the brace 404e is shaped with slats that collectively form a sloped surface connecting push tab to TPA housing body 402e. In various embodiments, a functional design may be changed to accommodate a particular manufacturing method, such as injection molding.

FIGS. 5A-5E illustrate additional push tab configurations in accordance with various embodiments. For each of these configurations, the attachment of the push tab on the exterior surface of the TPA housing may be anywhere along the distal portion of the TPA housing, such as on the distal collar portion of the TPA housing. As discussed above, a push tab may be flush with a plane defined by the distal opening of the TPA housing, or spaced apart from that opening such that the push tab is attached proximal to, rather than flush with, the distal opening of the TPA housing. In general, these and other variations in the functional design of the push tab shape enhance traction with the user's finger, and improve control when threading a PIVC.

Figure 5C:
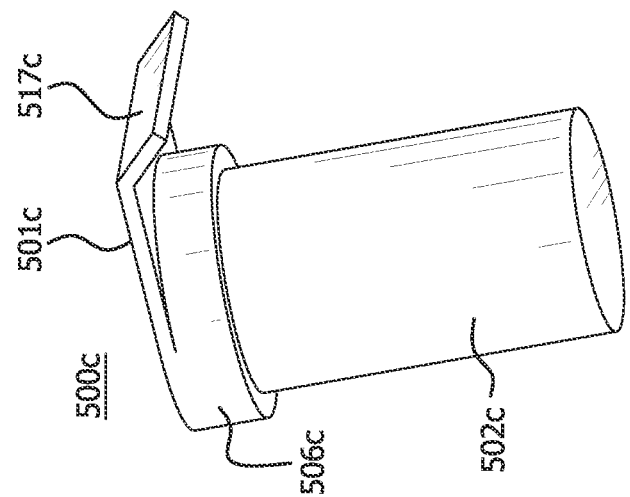
FIGS. 5A-5C illustrate various embodiments of push tab functional designs, in accordance with various embodiments.
Figure 5B:
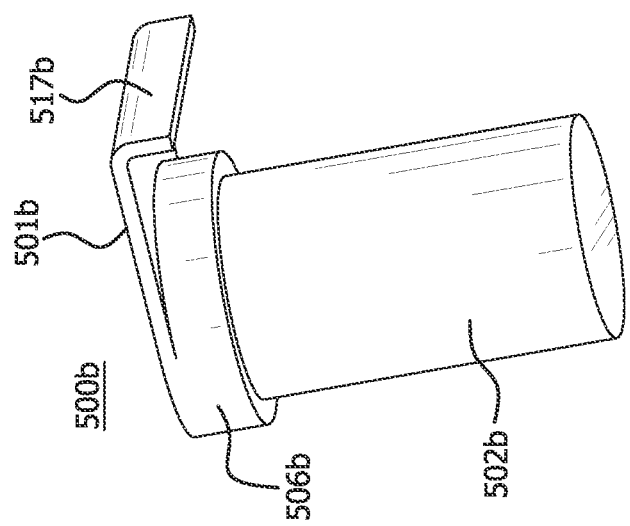
Figure 5A:
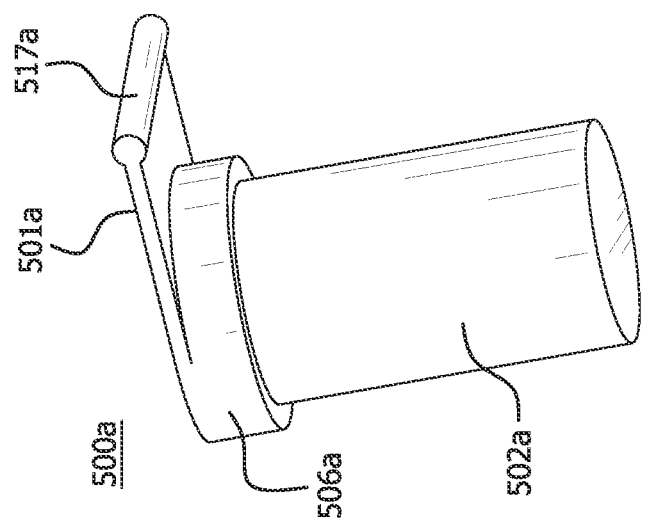

As illustrated in FIG. 5A, the TPA housing 500a comprises a push tab 501a disposed flush with the distal opening at the distal collar 506a of the TPA housing 502a and further comprising a rolled edge 517a to enhance a secure engagement with a finger of the user.

FIG. 5B illustrates a TPA housing 500b that includes a push tab 501b, disposed flush with the distal opening at the distal collar 506b of the TPA cylindrical body 502b, and further comprising a curved portion 517b that curves in the proximal direction. A proximal edge of the curved feature 517b may be engaged by the user's finger.

FIG. 5C illustrates a TPA housing 500c that includes a push tab 501c disposed flush with the distal opening at the distal collar 506c of the TPA cylindrical body 502c and further comprising a bent/folded portion 517c that extends in the proximal direction. A proximal edge of the bent feature 517c may be engaged by the user's finger.

These push tab configurations assist with traction and control during threading. In other embodiments not illustrated, the features to enhance traction and control may comprise ridges, grooves, bumps, or a chamfered edge or surface or combinations thereof.

Figure 5D:
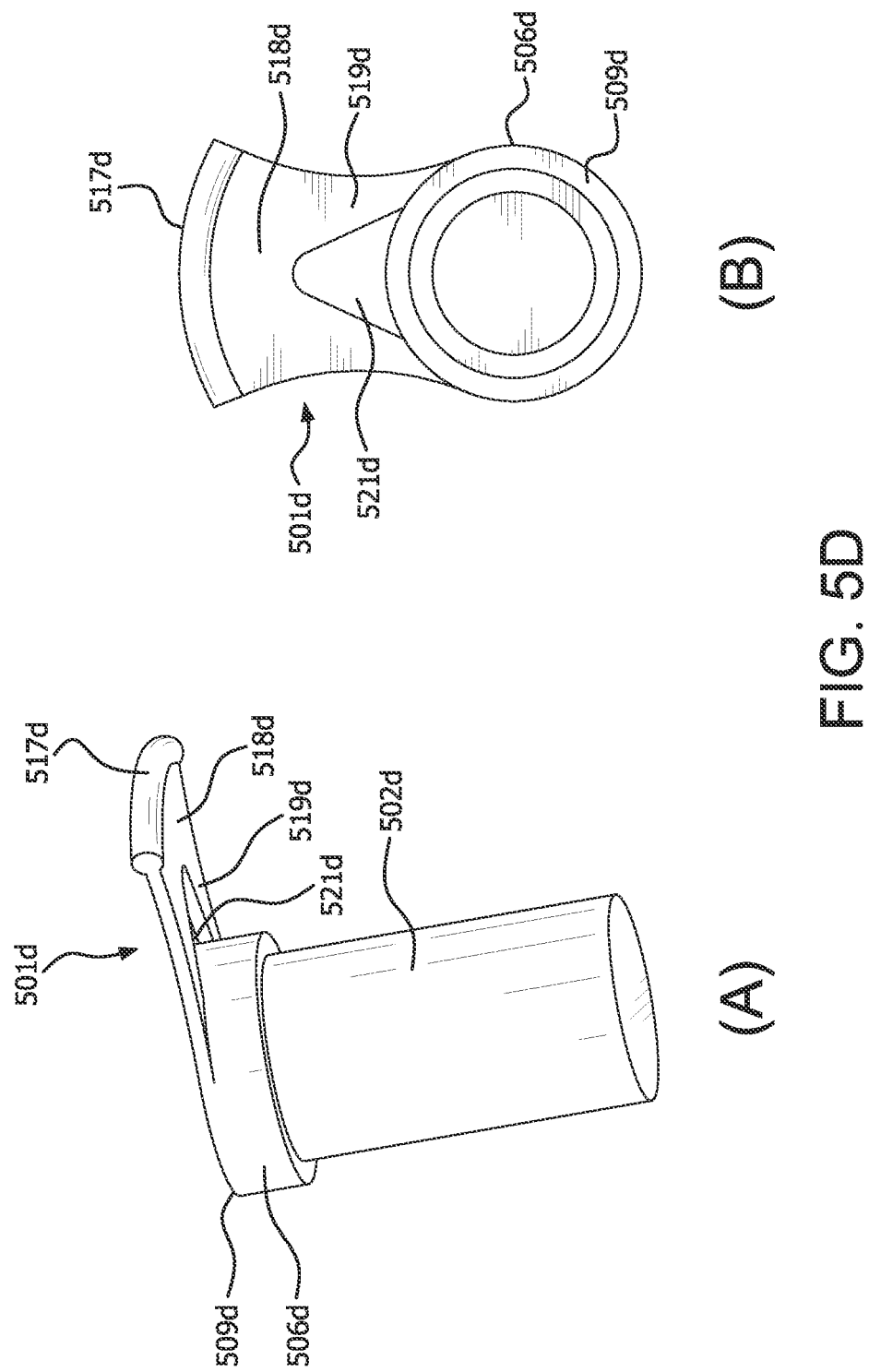
FIG. 5D illustrates an embodiment of a flared push tab functional design wherein a larger portion of the push tab is connected to the TPA housing by two narrower portions, in accordance with various embodiments.

FIG. 5D illustrates both a bottom perspective view (A) and a top view (B) of a push tab 501d comprising a flared shape where the base of the tab is narrower than the top. In this embodiment, the push tab 501d comprises a larger flared-out portion 518d and two smaller portions 519d that form connecting segments attaching the push tab 501d to the collar 506d of the TPA housing 502d. In various embodiments, the push tab 501d may be connected to the exterior surface of the TPA housing 502d at more than one segment, such as two or three connecting segments. In the embodiment illustrated in FIG. 5D, two connecting segments 519d and the larger flared-out portion 518d of the push tab 501d surround and define a space 521d. Such configurations allow for less material in manufacturing, along with a way to control feel of the tab when in use. In this particular embodiment, the two connecting segments 519d merge into the collar 506d flush with the distal opening 509d of the collar 506d portion of the TPA housing 502d. In other embodiments, a push tab may comprise a tapered shape where the base of the tab is thinner than the top, or vice versa, or comprising vertical ribs aligned with the long edge of the push tab.

Figure 5E:
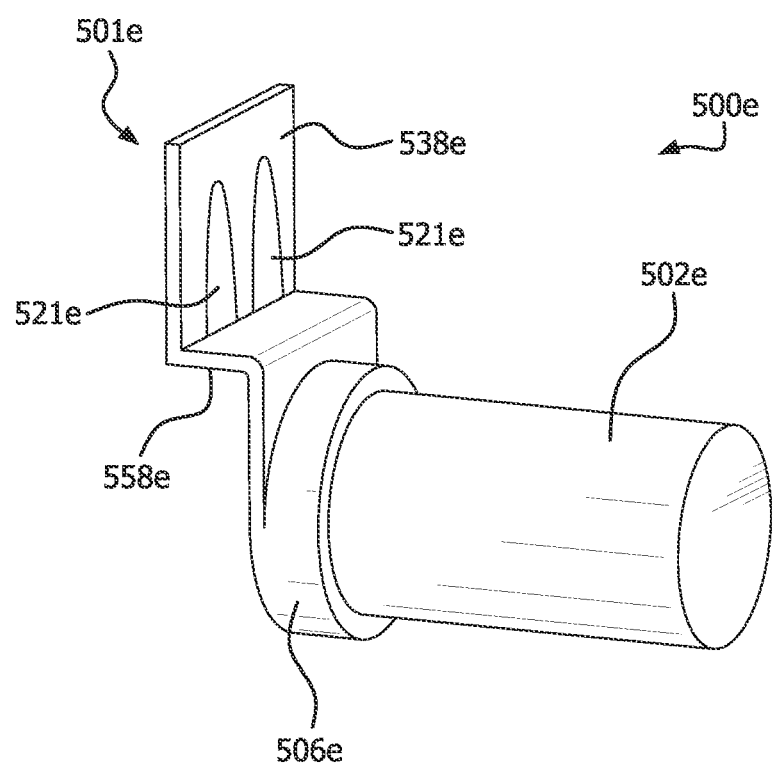
FIG. 5E illustrates an embodiment of a stepped push tab that provides push tab positioning over the catheter hub when the PIVC is in a ready-to-use configuration, in accordance with various embodiments.

FIG. 5E illustrates an embodiment of a TPA housing 500e comprising a push tab 501e configured in a step-structure to extend over the catheter hub when the catheter assembly is in the ready-to-use configuration. As illustrated, the push tab 501e comprises both an axial portion 558e that extends distally and a radially extending portion 538e contiguous with, and orthogonal to, the axial portion 558e. In use, when the collar portion 506e is attached to the proximal end of the catheter hub, the push tab will extend partially over the proximal end of the catheter hub when the TPA housing is attached to the catheter hub, such as in a ready-to-use configuration. As illustrated, the push tab 501e may further comprise fenestrations 521e to adjust flex and provide for comfort. In other embodiments, these features 521e may comprise texturing to assist with finger engagement.

Figure 6:
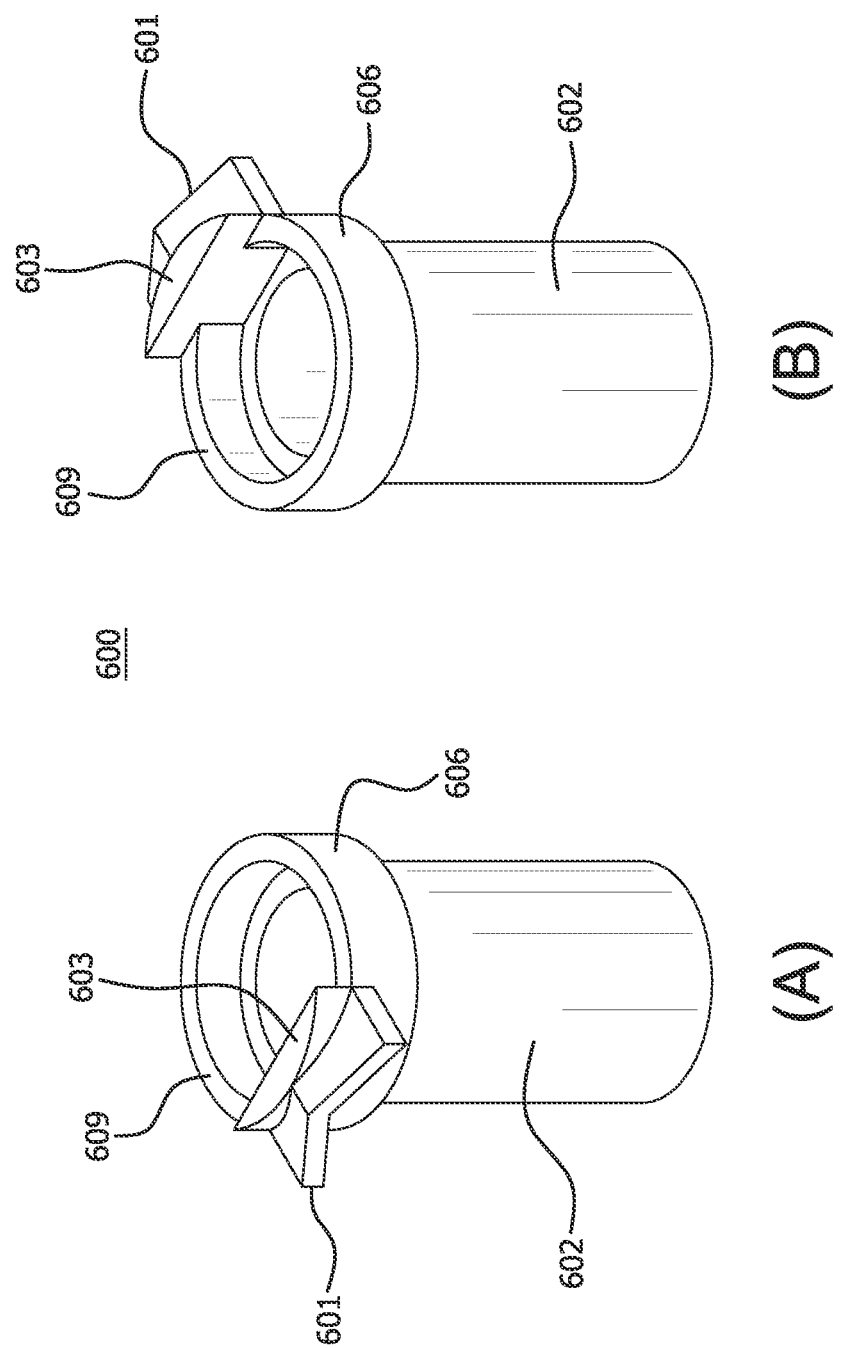
FIG. 6 illustrates two rotational perspective views of an embodiment of a push tab functional design that provides both a directional indicia and an alignment feature to rotationally index the TPA to the catheter hub, in accordance with various embodiments.

FIG. 6 illustrates two rotational views (A) and (B) of an embodiment of a TPA housing 600 comprising a push tab 601 having an angular or "V-shape." In various embodiments, a push tab may comprise at least two non-parallel surfaces. In the illustrated embodiment, the shape of the push tab 601 resembles an arrow, and can be used as an indication of the direction a user should push the catheter hub and the connected TPA housing during threading. The V-shape of the push tab 601 provides both a finger rest for pushing against the push tab and an indicia showing push direction for threading the catheter assembly. The shape of the push tab 601 may enhance control when threading with one hand. The push tab 601 may extend onto a distal alignment feature 603, which as discussed above may be used to rotationally index the TPA housing to the proximal end of the catheter hub. In embodiment 600, the apex of the arrow-shaped push tab 601 may extend distally beyond the distal opening 609 of the collar portion 606 of the housing. The alignment feature 603 extends distally beyond the opening so that it can participate in a tab/notch indexing of the TPA housing to the catheter hub.

Figure 7B:
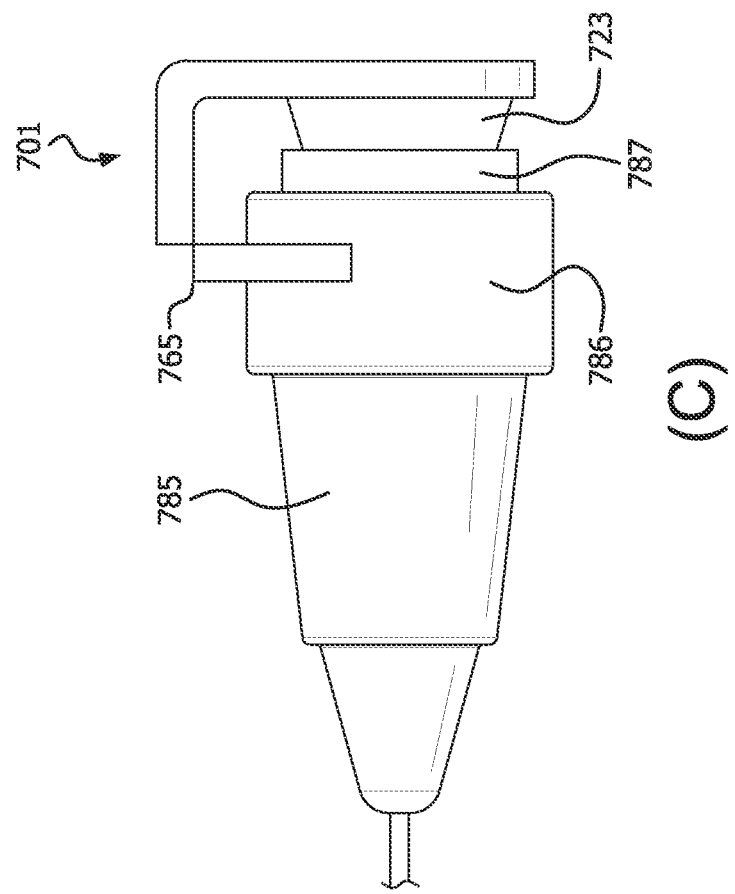

FIGS. 7A and 7B illustrate an embodiment of a hinged push tab and a method of use thereof, wherein in various configurations, the hinged push tab provides both a surface for the operator to engage when threading the catheter assembly and a feature usable to fluidically seal or at least cover and obscure the proximal opening of the catheter hub once the catheter has been placed. In various embodiments, a hinging push tab provides for two positions of a catheter hub, namely (1) a ready-to-use position wherein the hinging push tab remains rotatable though a hinge toward a proximal fitting provided on the catheter hub, and (2) a safety position wherein the hinging push tab is coupled to the proximal fitting of the catheter hub to reduce an overall height of the catheter hub.

With reference to configuration (A) in FIG. 7A, a hinging push tab 701 is configured on a proximal portion 786 of a catheter hub 785 rather than on a TPA connected to the catheter hub 785. It should be appreciated that the catheter hub without the hinging tab is used with the TPA housing 702 as discussed in the previous embodiments where the push tab is configured to the TPA housing. Without regard to the push tab, FIG. 7A illustrates the exemplar interrelationship between the catheter hub 785, the TPA housing 702 and the needle hub 730. In a ready-to-use configuration as shown, and as explained above, a catheter assembly further comprises a needle hub 730 engaged with the proximal end of the catheter hub 785. The catheter hub 785 will typically include a central bore 730c, a side port 730b represented by an opening to a side of the catheter hub 785 and a septum 730a positioned within the central bore 730c proximal the sideport 730b, as per illustrated in the partially cut-away views of (A) and (B1) of FIG. 7A. As further shown in (A) of FIG. 7A, a TPA housing 702, shown in dotted lines, may be beneath an outer housing of the needle hub, such as referred to as a "finger grip portion." The introducer needle, extending distally from the needle hub, is not visible since the needle is axially disposed through the catheter hub and through the catheter tube 785b attached to the distal end of the catheter hub. The hinging push tab 701 comprises both axially and proximally extending portions, although the hinging push tab 701 in configuration (A) may be entirely radially extending, i.e., an upstanding push tab. In this embodiment, the hinging push tab 701 further comprises a hinge 765, which may comprise a living hinge (a thinner portion) or a notch providing a demarcation where the hinging push tab 701 can bend or fold. The hinge 765 may be configured to operate only in one direction, e.g., to allow folding a portion of the hinging push tab 701 in a proximal direction, blocking folding in the distal direction so that a user can push on the hinging push tab without it inadvertently hinging under pressure. In various embodiments, the hinging push tab 701 may comprise more than one hinge or notch, or may comprise resilient "rubbery" portions capable of flexing. As illustrated in configuration (A), the hinging push tab 701 further comprises a resilient portion 723, explained below.

When the catheter assembly is in a ready-to-use configuration (A) in FIG. 7A, the distal end of the TPA housing 702 is attached to a fitting 787 provided on the proximal end 786 of the catheter hub 785. The shapes of the portions of the catheter hub 785 are not meant to be precise or limiting, because the catheter hub will typically include a side port, wings and other features not illustrated. As discussed above, the proximal fitting 787 may be one component of a male/female snap fitting coupling between the TPA housing 702 and the catheter hub 785. As also explained above, once the introducer needle has been placed into the vessel of the patient, the needle hub 730 is withdrawn (in the direction of the block arrows shown, typically proximally) while the catheter hub is pushed distally, so as to remove the introducer needle from the vessel and replace it with the catheter tube. For this placement, the user may engage and push against the hinging push tab 701, such as pushing against a proximal edge while it's in this partially folded over position.

With reference now to configuration (B1/B2) in FIG. 7A, once the needle hub 730 has been fully withdrawn, the sharp distal tip of the introducer needle is trapped within the needle guard mechanism of the TPA, and the entire TPA assembly is disengaged from the catheter hub. What remains fluidically attached to the patient's vasculature is the catheter hub 785 as shown in both side plan view (B1) and a proximal perspective view (B2). Positioned inside the proximal collar portion 786 of the catheter hub 785 is typically a resilient septum (not illustrated) configured to block blood flow out of the proximal fitting 787 of the catheter hub 785. Access to the patient's vasculature is typically only by way of the side port fluidically configured into the catheter hub. However, a user may mistakenly attempt to infuse or extract fluids through the septum configured in the proximal end of the catheter hub, particularly since the septum is still accessible and likely visible to some extent. The hinging tab 701 may now be used to block any attempted access through the proximal end of the catheter hub and, in various embodiments, to fluidically seal it.

With reference to both FIGS. 7A and 7B, and the transition from configuration (B1/B2) to configuration (C), the hinging tab 701 can now be folded around to fluidically seal off or otherwise shield or obscure the proximal end 787 of the catheter hub 785. In various embodiments, the hinging tab 701 may be configured to close automatically rather than manually. To configure the tab as such, the catheter hub 785 comprising the integral hinging push tab 701 may be molded with the hinging push tab 701 in the folded position such that the plastic retains shape-memory of this configuration. For a shape-memory embodiment, the needle hub 730 can be used to bias the hinging push tab 701 into an upright position in the ready-to-use configuration (as per (A) in FIG. 7A). Once the needle hub and the TPA containing the captured needle tip are pulled away and entirely off the catheter hub, the hinging tab 701 then automatically returns to its molded position by virtue of the shape-memory characteristics of the material from which it is molded. In various embodiments, the shape-memory characteristics may suffice to automatically move the hinging push tab around and at least close to the proximal opening 787 of the catheter hub 785, in which case the final snap fitting or plugging of the resilient portion 723 can at least be manually accomplished.

In various embodiments, and as illustrated in the transition in configurations from (B1/B2) to (C), the hinging push tab 701 is entirely manually folded around and physically snapped into the proximal end of the catheter hub, facilitated as such with a living hinge 765 to direct the folding. In various embodiments, portions of the push tab may be resilient to also facilitate the folding over process. The curved arrow in the illustration (B1) represents how the hinging push tab is moved to cover the proximal opening 787 of the catheter hub 785. As illustrated, the hinging push tab 701 comprises a resilient portion 723 dimensioned to fit into the same snap fitting 787 previously used to secure the TPA to the catheter hub 785 when the catheter assembly was in the ready-to-use configuration. In various embodiments, the resilient portion 723 may comprise a circular female collar dimensioned to accommodate the male fitment 787 of the catheter hub 785. As per the fit between the distal end of the TPA housing and the proximal end of the catheter hub, the male and female components of the snap fitting can be reversed, and in that case, so would be the resilient portion 723 of the hinging push tab and the proximal fitment 787 on the catheter hub. In various embodiment, the resilient portion 723 may comprise a silicone rubber or other elastomeric polymer plug, dimensioned to fit into the proximal end of the catheter hub like a cork, seeing that the septum within the catheter hub suffices to seal off fluid flow out the proximal end of the catheter hub the fit between the resilient portion 723 and the proximal fitment 787 of the catheter hub 785 need not be fluid-tight. In various embodiments, the back side of the hinging push tab may carry indicia, like a large "X" to indicate the proximal end of the catheter hub, now blocked by the resilient portion 723, is not the proper accessway to the patient's vasculature, forcing the practitioner to use the side port of the catheter hub.

With reference now to configuration (C) in FIG. 7B, the resilient portion 723 of the hinging push tab 701 is now fit into, or onto, the proximal fitment 787 provided on the proximal end 786 of the catheter hub 785. In this way, the proximal end of the catheter hub may be fluidically sealed, or it may be simply be closed off or shielded from view with an arrangement that at least indicates "no access" but which might not be fluid-tight.

A hinging push tab configuration, such as illustrated in operation in FIGS. 7A and 7B, enables incorporation of a large push tab without negatively affecting dressing over top of the catheter assembly thus placed. In such embodiments, the push tab, when in the closed or down position, can be coupled with other functions. In the down position, the tab can be configured to also cover the proximal opening of the catheter hub, which is desirable in a closed system where the proximal opening to the catheter hub should not be accessed. For conventional catheters, the push tab 701 can act as a plug to selectively occlude or access the lumen of the catheter hub 785, which could prevent blood leakage and potential contamination and improve ease of use.

While a large push tab makes it easier to thread the catheter, it could possibly inhibit proper dressing the catheter. In accordance with various embodiments, and as illustrated by example in FIGS. 7A and 7B, a hinging push tab 701 is affixed to the catheter hub 785 instead of the TPA housing 702. In this concept, the hinging push tab 701 can pivot or hinge about its point of fixation, starting in the vertical position, but after the needle and TPA are removed, the hinging push tab 701 flips down or can be manually flipped down, axially aligned with the flow path through the catheter. In this way, the hinging push tab 701 can be large enough to facilitate threading with one hand, but after insertion it can flip down or be manually flipped down to minimize the overall height of the catheter assembly and allow for proper dressing over top.

In accordance with various embodiments, the hinging push tab 701 is fixed to the catheter hub 785, and is configured to pivot between an up and a down position. Various embodiments may include a living hinge, pin, fastener, or flexible material at the base of the push tab 701 near the catheter hub 785 that allows the push tab 201 to rotate positions. In various embodiments, the push tab 701 is held upright when the device is assembled, such as in a configuration whereby the needle hub is pushed up against the hinging push tab 701. In various embodiments, the starting position of the needle assembly, or finger grips, holds the hinged push tab 701 in the vertical position illustrated in FIGS. 7A, (A) and (B).

In various embodiments, the hinging push tab 701 does not include a resilient portion 723. After threading the catheter and removing the needle from the catheter hub 785, the hinging push tab 701 may be flipped down to simply lay flat against the catheter hub 785. In these embodiments, once down, push tab 701 is out of the way, improving the ability to dress the catheter.

In accordance with various embodiments, the hinging push tab 701 may be bent or curved, such as to improve control when threading, but the angular shape may further enable: (i) the push tab 701 to cover the proximal end of the catheter hub and close off the internal septum when flipped down, and/or (ii) the push tab 701 to include a plug or boss to occlude the catheter hub 785. In this regard, various embodiments may (i) prevent access through the lumen of the catheter hub 785 for closed system catheters, and/or (ii) prevent blood leakage in systems without blood control catheters.

In placement of a PIVC, there can be off-axis torque between the interface (e.g., the snap fit) of the catheter hub 305 and the TPA when inserting the device, threading the catheter, when withdrawing the needle into the TPA and when pulling the TPA off the catheter hub by continued pulling on the needle hub. This off-axis torque can lead to difficulty threading, accidental early release of the TPA from the catheter hub, and awkward angles when removing the needle. Early, or "pre-release" of the TPA from the catheter hub is quite dangerous, since the sharp distal tip of the needle has not yet been captured in the needle guard mechanism inside the TPA housing. To overcome these and other issues, a TPA with a segmented, flexible, and pivoting design allows the TPA to flex and bend relative to the catheter hub, without pulling the TPA from the hub. When pulling the TPA from the catheter hub, the segmented and flexible TPA allows for an angled disconnection.

Figure 8A:
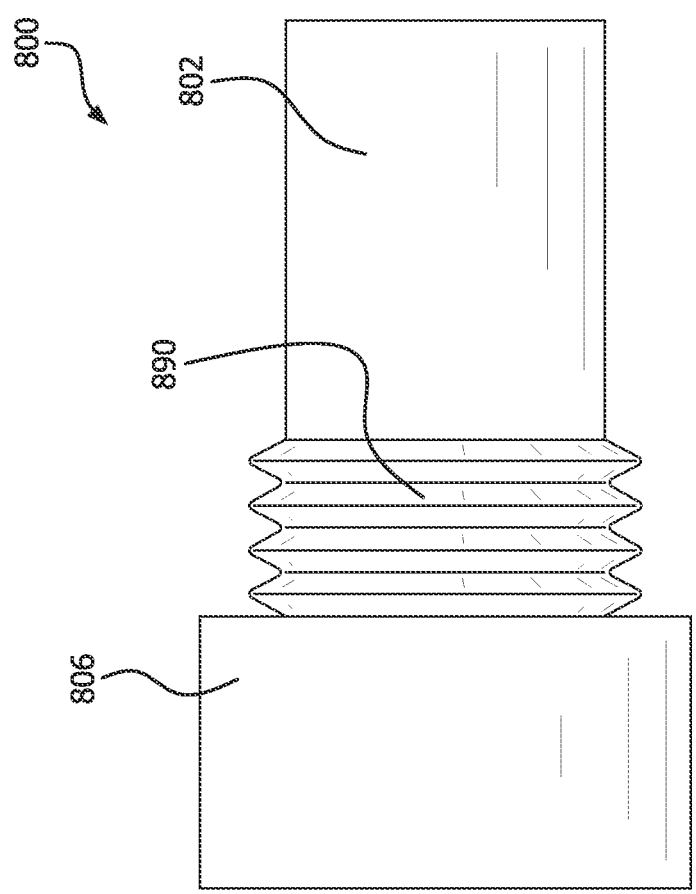
FIG. 8A illustrates a flexible and segmented TPA housing capable of pivoting on the end of the catheter hub about a proximal-distal axis, in accordance with various embodiments.

FIG. 8A illustrates a segmented and flexible TPA housing 800. The TPA housing 800 comprises a distal collar portion 806 attached to a smaller diameter cylindrical body 802 through a flexible "accordion-like" portion 890 such that the three portions are coaxially aligned, and may comprise a single molded plastic part. The flexible portion 890 of the housing may comprise thinner walled plastic or metal segments, in a ribbed and undulating structure, such as might be found in plumbing connections and air vent structures, (e.g., what is referred to as "accordion tubing"). Such a flexible housing as exemplified in FIG. 8A may reduce torque on the interface with the catheter, which may help to obviate the need for a more expensive locking/latching interface.

The TPA housing collar 806 and the TPA cylindrical body portion 802 can flex and bend relative to one another. The TPA collar 806 is still removed from the proximal end of the catheter hub by pulling back on the finger grips/needle hub and removing the needle along with the TPA, but the segmented portion 890 allows bending and prevents pre-release of the TPA due to off-axis loading.

Figure 8B:
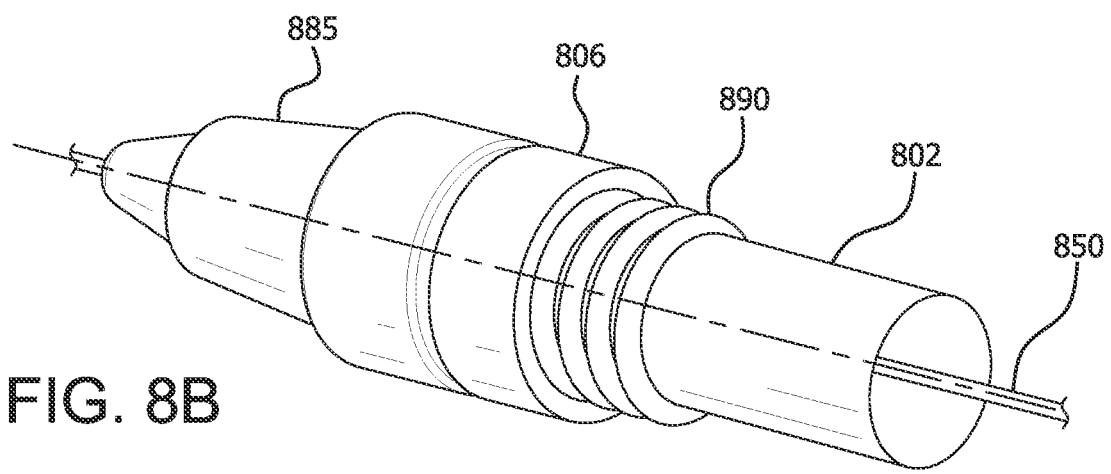
FIGS. 8B-8D illustrate the ability of the flexible TPA housing of FIG. 8A to pivot at angles to the proximal-distal axis running through the catheter hub, in accordance with various embodiments.
Figure 8C:
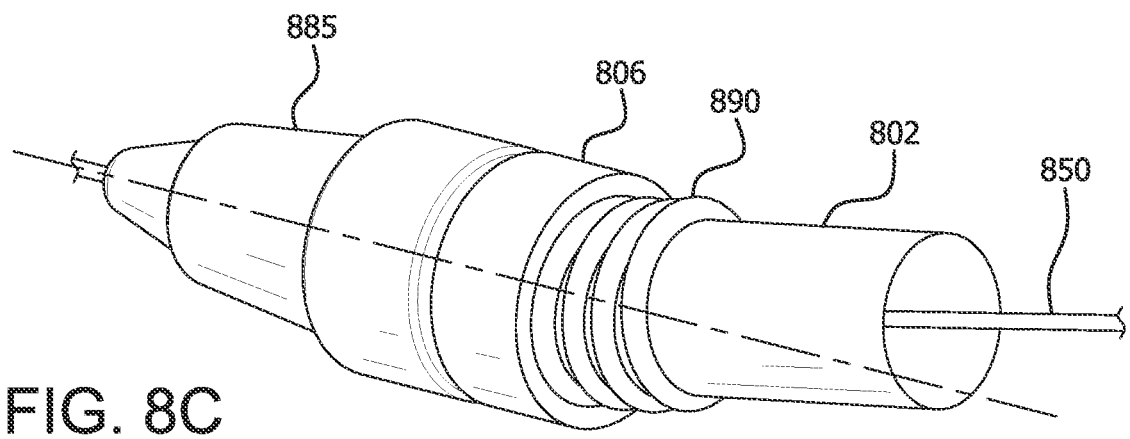
Figure 8D:
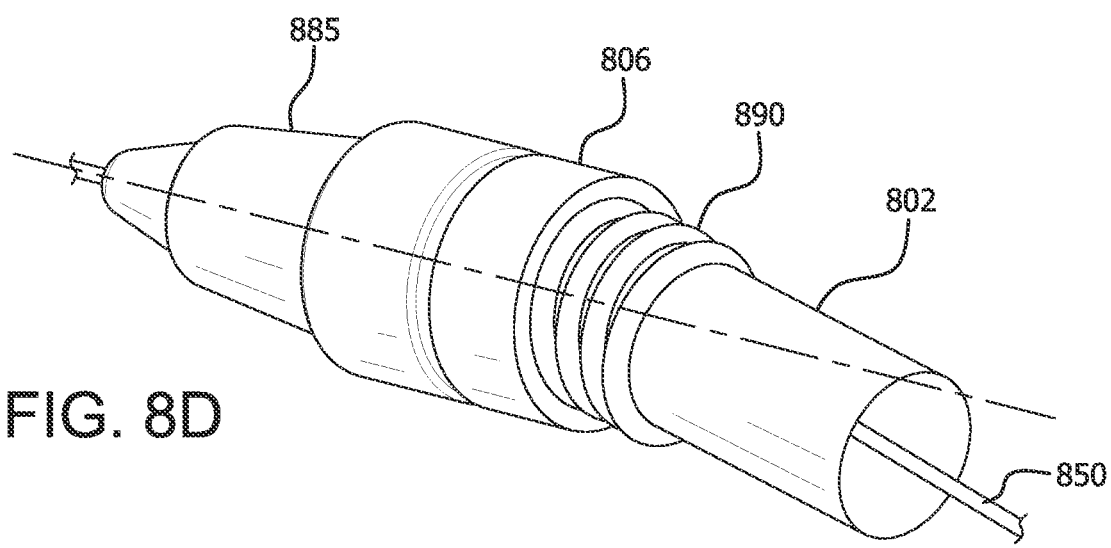

FIGS. 8B-8D illustrate the bending and flexibility between the TPA housing and the catheter hub provided by the flexible, segmented portion 890. FIGS. 8B-8D illustrate that the interface 890, configured between the TPA collar 806 and cylindrical body 802, is flexible, allowing the proximal portion 802 of the TPA to pivot and move off-axis while the distal collar portion 806 remains securely attached to and positionally stable on the proximal end of the catheter hub 885. FIG. 8B illustrates axial alignment between the proximal portion 802 of the TPA housing and the catheter hub 885. FIGS. 8C and 8D illustrate how the flexible interface 890 accommodates off-axis needle removal, isolating off-axis loading from the catheter hub/TPA interface. Additionally, a flexible TPA housing can reduce needle-drag when removing the needle at high angles. Further, such a flexible TPA housing can ensure the TPA is only removed due to axial pull force and not due to off-axis loading. Still further, a flexible TPA housing may improve ease of use at various angles of insertion.

In some situations, a PIVC will be placed in a patient in a noisy environment where it can be difficult to hear an audible signal various components of the PIVC might make when moved. The following embodiments illustrated in FIGS. 9-11 describe TPAs with visual lock indicators, to provide a visual cue to confirm the needle guard portion of the TPA has properly engaged on the sharp needle tip, prior to removing the TPA from the catheter hub.

In various embodiments, a TPA comprises one or more indicia providing confirmation that the needle guard portion of the TPA has captured and secured the sharp distal tip of the introducer needle. In various embodiments, the indicia comprises a viewing portal, e.g., a clear plastic "see-through" portion or an open fenestration, through which a user can see if the needle guard inside the TPA housing has secured around the sharp tip of the needle, communicating to the user that it is otherwise safe to disengage the TPA from the catheter hub. In other embodiments, a TPA comprises axially nested portions are slidable relative to one another, and the pulling of the needle guard with the needle tip captured therein slides indicia, e.g., lettering and/or color, into the view of the user, communicating to the user that it is safe to continue pulling to disengage the TPA from the catheter hub.

Figure 9:
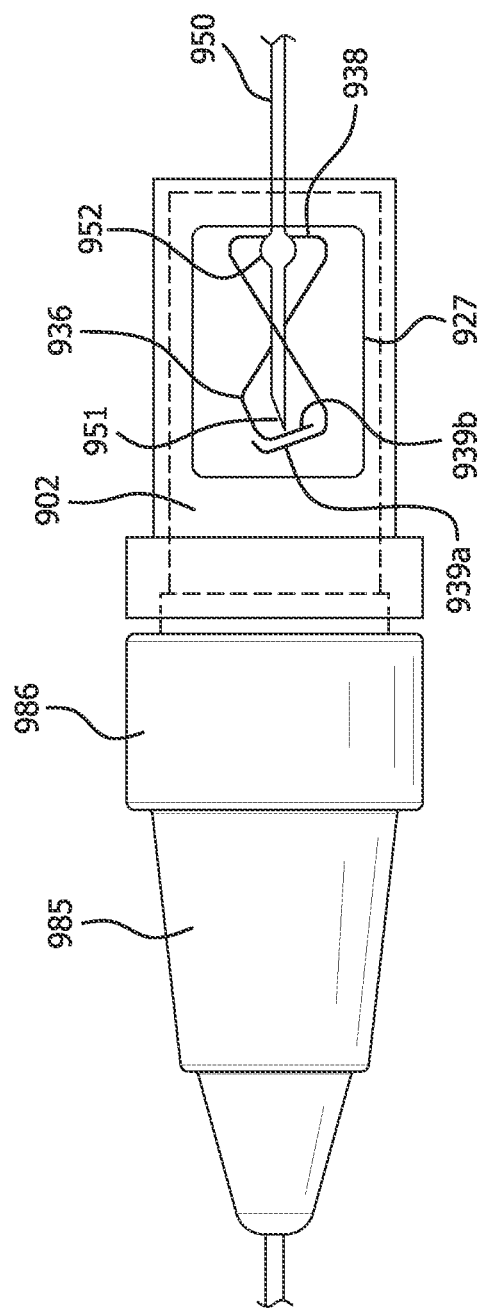
FIG. 9 illustrates a TPA housing further comprising a visual lock indicator in the form of a transparent viewing window or open fenestration allowing visualization of the needle guard within the TPA housing, in accordance with various embodiments.

With specific reference now to FIG. 9, a TPA housing 902 comprises an aperture 927 as the indicia element. The entire TPA housing 902, or just a portion of same, can be made of a clear plastic, or the TPA housing 902 may comprise a clear plastic window, or a proximal retaining insert can be elongated and made clear. In other embodiments, the indicia feature 927 may be an open fenestration, i.e., an aperture. When the needle 950 is withdrawn, a protrusion 952 on the needle shaft engages the back wall 952 of a clip 936 and pulls it proximally into the view through the window 927. In other embodiments, capture of the needle tip 951 by action of the distal flanges 939a and 939b of the clip close in front of the sharp tip 951, causes the clip to change shape. In various embodiments, the change in shape of the clip 936, particularly the movement of the crossed arms, and/or the closing of the clip, changes the shape of the clip in a visually observable way. The clear portion or opening 927 enables the user to see the location of the clip 936 as an indicator that the safety mechanism is activated, or the closing of the clip changes the shape and the visibility of the clip 936, or an element of the clip through the window 936. Alternatively, the clip 936 or a portion thereof can be colored with a bright color, or configured with a brightly colored indicator, such that the location of the clip 936 within the TPA housing 902 is readily visible to the user. In various embodiments, the TPA housing 902 can be elongated proximally. The TPA, a segment of the TPA body, or the TPA window can be clear. The locking action can change the clip position, or the shape of the clip, which can be visible through the TPA retainer. Embodiments can include a color on the locking clip, or a secondary visible element to improve visibility thru retainer window.

Figure 10A:
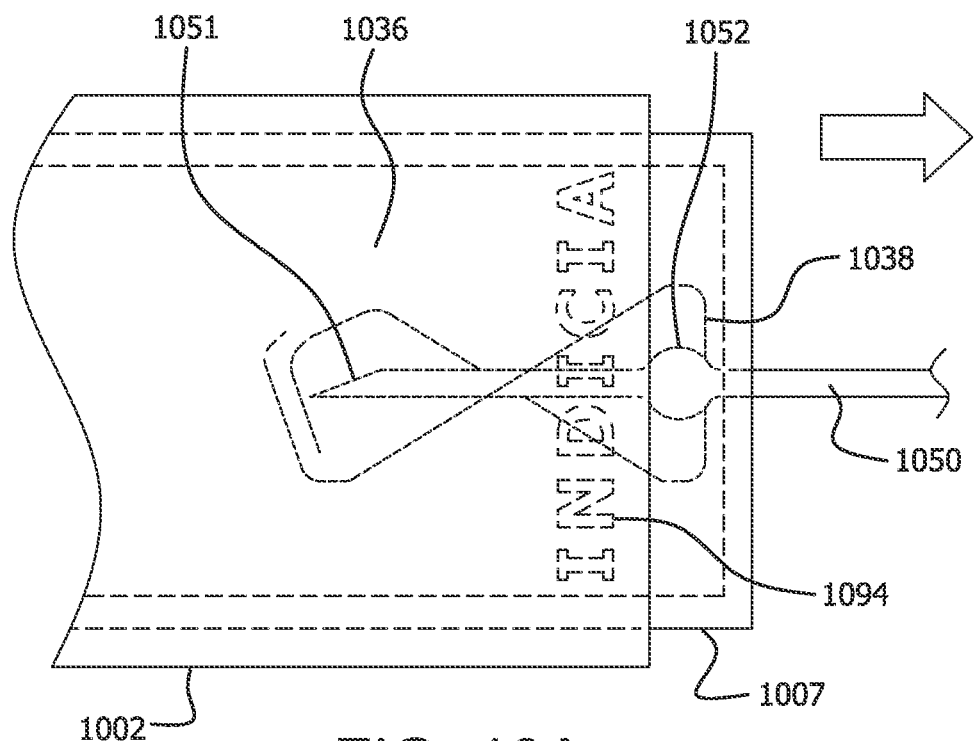
FIGS. 10A and 10B illustrate an embodiment of a TPA housing comprising an axially slidable visual indicia to signal capture of the needle by the needle guard configured within the TPA housing, in accordance with various embodiments.
Figure 10B:
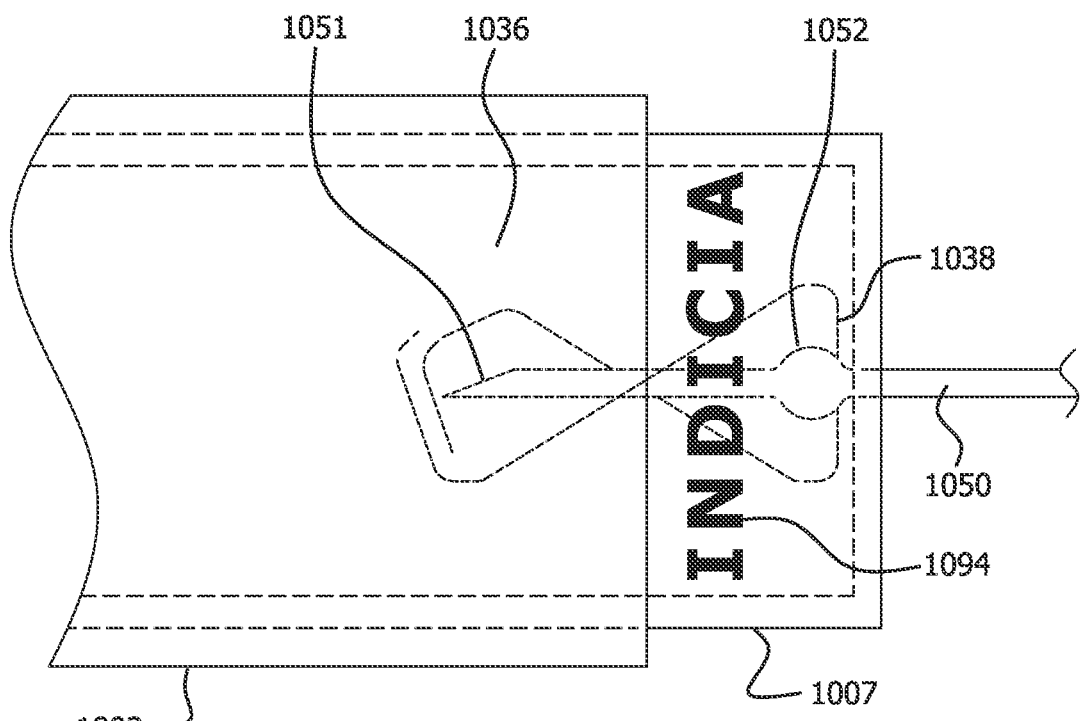

With specific reference now to FIGS. 10A and 10B, an embodiment of a TPA housing configured with a slidable indicia is illustrated. In various embodiments, the TPA comprises an outer tubular sleeve and an inner tubular sleeve (also referred to as the TPA retainer or the needle guard retainer) slidable within the outer tubular sleeve along the same central axis. That is, the outer and inner tubular sleeves are nested. The clip retaining housing 1007 of the TPA assembly can be configured as the proximal part of the TPA, slidably arranged inside a stationary outer sleeve 1002. The TPA retainer 1007 length and undercuts can be elongated to accommodate a slidable length and indicia. The TPA retainer 1007 can be clear or opaque, but with at least one visual indicia 1094 at discrete longitudinal locations. The elongated section can include multiple undercuts of various depth, holding forces, or elongated slots. As the needle 1050 is removed, a protrusion 1052 configured on the needle shaft engages the back wall 1038 of the clip 1036, causing the clip 1036 to pull up against the proximal wall of the TPA retainer 1007. The TPA retainer 1007 can be pulled out partially from the outer TPA housing 1002 to reveal the indicia 1094 in FIG. 10B, indicating the needle guard has captured the needle tip 1051 and has been pulled back. The TPA retainer 1007, i.e., the inner sleeve portion, can still remain partially nested within the TPA outer housing 1002 due to secondary undercuts provided. The undercuts prevent the TPA housing from being pulled entirely out from the overall TPA, and allows the user to disengage the TPA from the catheter housing with continued pulling.

Figure 11A:
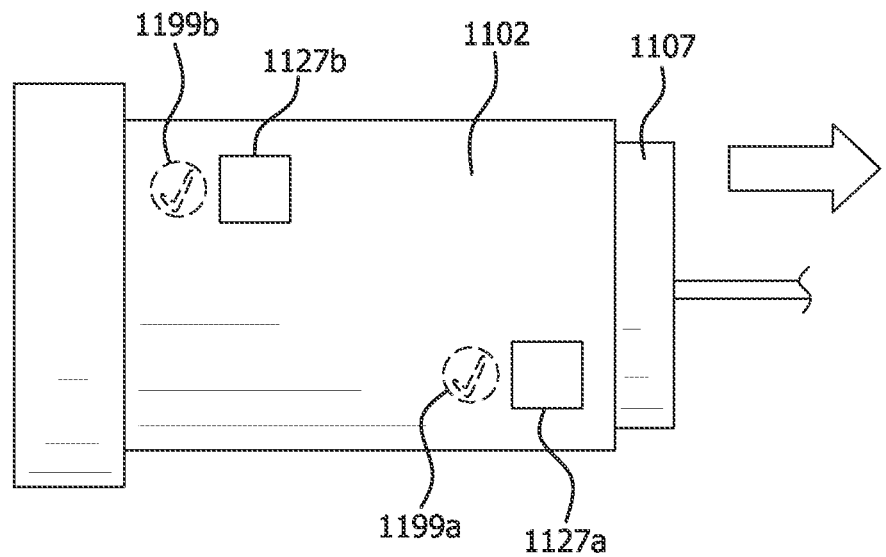
FIGS. 11A and 11B illustrate an embodiment of a TPA housing comprising an axially slidable visual indicia to signal capture of the needle by the needle guard configured within the TPA housing, in accordance with various embodiments.
Figure 11B:
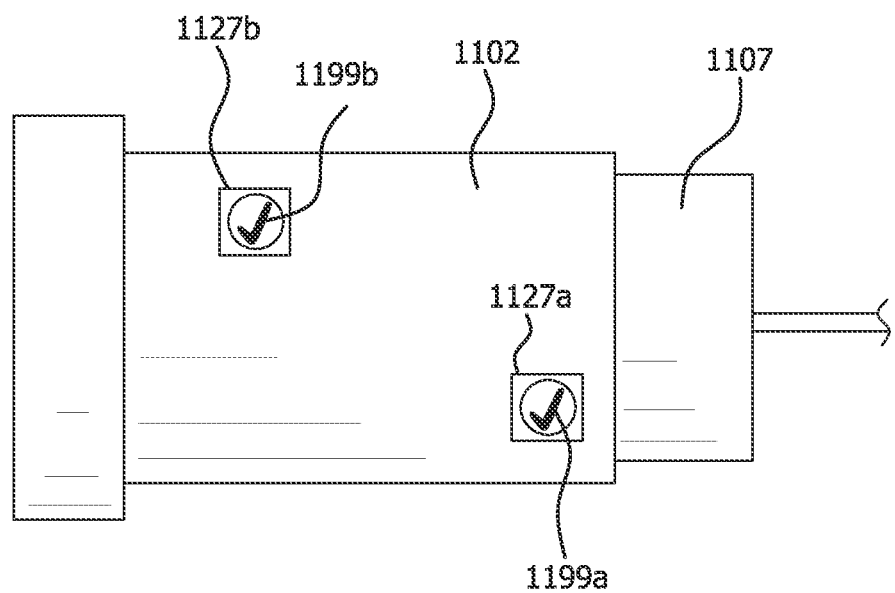

With specific reference now to FIGS. 11A and 11B, an example of distal and/or proximal moving indicia viewable through one or more apertures is illustrated. The outer TPA tubular sleeve 1102, or a portion thereof, can be clear or translucent. As illustrated in FIG. 11A, a proximal aperture 1127a and/or a distal aperture 1127b may be provided in the outer tubular sleeve 1102 of the TPA. The TPA is configured with axially nesting inner and outer tubular sleeve portions, wherein an inner portion, the TPA retainer 1107, is slidably engaged inside the TPA housing 1102 configured with a larger diameter. The configuration of inner and outer sleeves can be substantially similar to the arrangement illustrated in FIGS. 10A-10B. Internal indicia, such as "checkmarks" or colors 1199a and/or 1199b are moved proximally to come into view through the windows 1127a and/or 1127b. In various embodiments, the internal indicia 1199a and/or 1199b, can be pulled back with the action of the locking-out the safety clip, as described in the context of FIGS. 10A-10B above. The movement of the indicia can be visible through one or more windows, to provide some contrasting visuals. In various embodiments, the indicia may begin visibly as red, and as the TPA retainer is pulled back, green indicia may become visible. In various embodiments, the indicia may be green and start out of view (e.g., as illustrated in the example of FIGS. 11A-11B), then the green segment (e.g., "checkmark") is pulled into the window to show a green indicia, signally the sharp distal tip of the needle is safely captured in the needle guard of the TPA.

Figure 12D:
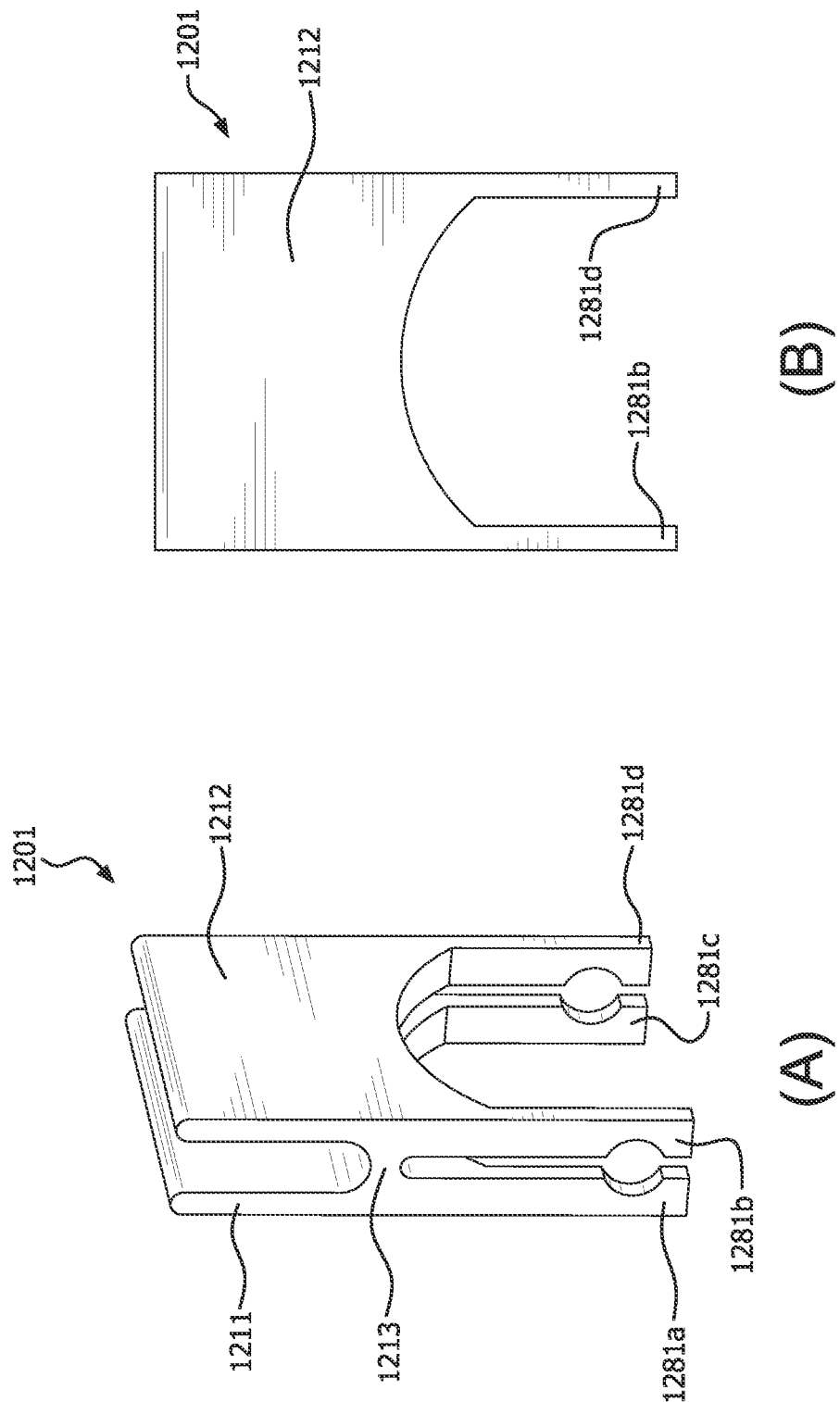

In various embodiments, a large push tab configured on the catheter hub may be pulled off and discarded once the PIVC has been placed in the patient's vasculature. As illustrated in FIGS. 12B-12D, a removable push tab 1201 can be a removable part to a catheter hub that is not permanently fixed to the TPA 1202 or the catheter hub 1285. In various embodiments, the catheter hub having these posts and removable tab with connecting arms, is convertible from a "placement" configuration with the arms of the removable push tab engaged on the posts, to a "placed" configuration with the arms of the removable push tab disengaged from the posts, and the tab fully removed from the catheter hub so that the height is substantially diminished.

As shown in FIG. 12A, a removable push tab 1201 comprises an upstanding portion having a proximal face and a distal face and two parallel arms descending therefrom. Each arm includes a forked end portion 1281a and 1281b configured to reversibly engage to each of two posts on the catheter hub. As illustrated in FIG. 12B, the removable push tab 1201 is snapped onto posts 1279 configured on opposite sides (180° apart) on a proximal portion 1286 of the catheter hub 1285 (only one post is visible in this side plan view). The forked portions 1281a and 1281b are configured to snap fit, via the circular cutout portions, over the cylindrical posts provided on the catheter hub. In this placement configuration, the removable push tab 1201 straddles the catheter hub 1285, and provides a surface to push the catheter hub 1285 distally to thread/advance the catheter.

As illustrated in FIG. 12C, the removable push tab 1201 may then be detached from the posts 1279, simply by pulling radially upwards, to change the catheter hub to a placed configuration. With the removable push tab 1201 thus removed, the height of the catheter hub 1285 is substantially reduced, allowing for dressing over the placed catheter. In various embodiments, the removable push tab 1201 can be detached and discarded before or after removing the needle and detaching the TPA 1202 from the catheter hub 1285. An advantage of this embodiment is it provides for a large push tab 1201 for easy threading, but minimizes the profile of the catheter hub 1285 to allow for easy dressing/securement.

In various embodiments, the removable push tab 1201 may further comprise operable features that provide "assisted removal" of the tab from the posts, such as illustrated in FIG. 12D. In various embodiments, the upstanding tab portion of the removable tab (1201 in FIG. 12A) is modified with a space between the proximal and distal faces such that the upstanding tab portion is split into a distal portion 1211 and a proximal portion 1212. The fork structure at the end of each arm is elongated, such that the removable tab having the assisted removal feature comprises an H-shaped cross section. In general, the assisted removal feature operates by squeezing together the distal portion 1211 and the proximal portion 1212 of the upstanding tab portion, which concomitantly opens each of the fork structures. That is, 1281a moves away from 1281b while 1281c simultaneously moves away from 1281d. The pinching together of the movable distal 1211 and proximal portions 1212 at the top of the tab, will open the fork structures provided at the bottom of the arms of the removable push tab 1201, similar to the action of a clothespin. In various embodiments, the removable push tab of FIG. 12D is an extruded part such that it is made with more than one material. For example, a thinner elastomeric portion 1213 provides a pivot point, much like the spring in a clothes pin, such that the squeezing together of portions 1211 and 1212 open the fork structures 1281a/1281b and 1281c/1281d. In various embodiments, strengthening rods are embedded in the long portions of the H-structure so that the translation of movement through the hinge portion 1213 is more efficient. In various embodiments, metal rod components are overmolded with plastic or elastomeric polymer. In various embodiments, the thinner hinge portion 1213 is configured to bend easily, such as when comprising a soft elastomeric polymer. Dissimilar plastics can be used to ensure bending at the hinge portion 1213, such as by extrusion similar to a stiped tubing process.

In the detailed description, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected, coupled or the like may include permanent (e.g., integral), removable, temporary, partial, full, and/or any other possible attachment option. Any of the components may be coupled to each other via friction, snap, sleeves, brackets, clips or other means now known in the art or hereinafter developed. Additionally, any reference to without contact (or similar phrases) may also include reduced contact or minimal contact.

Benefits, other advantages, and solutions to problems have been described herein with regard to specific embodiments. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to 'at least one of A, B, and C' or 'at least one of A, B, or C' is used in the claims or specification, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

All structural and functional equivalents to the elements of the above-described various embodiments that are known to those of ordinary skill in the art are expressly incorporated herein by reference and are intended to be encompassed by the present claims. Moreover, it is not necessary for an apparatus or component of an apparatus, or method in using an apparatus to address each and every problem sought to be solved by the present disclosure, for it to be encompassed by the present claims. Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

The invention claimed is:

1. In combination, a catheter assembly and a tip protector assembly therefor,
   wherein the catheter assembly comprises:
   a catheter hub extending along a central axis having a proximal end and a distal end wherefrom a catheter extends;

a needle having a distal tip and a proximal end attached to a distal end of a needle hub, the needle slidable along the catheter hub and the catheter, the distal tip extendable beyond a distal end of the catheter; and wherein the tip protector assembly comprises:

a cylindrical housing having a body defining a hollow interior extending along the central axis including a proximal end having a proximal opening with a proximal diameter and an enlarged distal end portion having a distal opening with a distal diameter, the distal diameter greater than the proximal diameter, the enlarged distal end portion adapted to be coupled to the proximal end of the catheter hub, the proximal end of the cylindrical housing being distal to the distal end of the needle hub;

a push tab extending upstandingly from the enlarged distal end portion of the cylindrical housing, the push tab having a push surface adapted to be engaged by a thumb or a finger of a user to move the cylindrical housing in a distal direction;

a needle guard within the hollow interior of the cylindrical housing slidable along the needle, the needle guard adapted to capture the distal tip of the needle when the needle is moved proximally relative to the catheter hub through the cylindrical housing.

2. The combination of claim 1, wherein the push tab further comprises a rolled edge along an edge of the push tab opposite the cylindrical housing, the rolled edge disposed substantially orthogonal to the central axis.

3. The combination of claim 1, wherein the push tab further comprises a curved or angular portion opposite the cylindrical housing, the curved or angular portion extending proximally from a proximal face of the push tab.

4. The combination of claim 1, wherein the enlarged distal end portion of the cylindrical housing comprises a collar having an inner surface defining the distal opening, the collar coupled to the proximal end of the catheter hub when the catheter assembly is in a ready position.

5. The combination of claim 4, wherein the push tab extends upwardly at a right angle from a top portion of the collar such that a distal surface of the push tab is flush with a distal end of the collar.

6. The combination of claim 4, wherein a distal end of the collar is the distal end of the cylindrical housing, and wherein the push tab has a distal surface flush with the distal end of the collar.

7. The combination of claim 4, wherein a distal end of the collar is the distal end of the cylindrical housing, and wherein the push tab has a distal surface positioned proximal the distal end of the collar.

8. The combination of claim 4, wherein the collar has a proximal end surface that rises from the body of the cylindrical housing, and wherein the push surface of the push tab is flush with the proximal end surface of the collar.

9. The combination of claim 1, wherein the catheter hub has a pair of wings defining a planar surface for the catheter hub, the push tab defining an upstandingly extension orthogonal to the planar surface.

10. The combination of claim 1, wherein the cylindrical housing comprises an alignment feature at the distal end that guides the distal end of the cylindrical housing to an indexed location at the proximal end of the catheter hub so that the cylindrical housing is coupleable to the catheter hub at a desired indexed position.

11. The combination of claim 1, further comprising an aperture at a side of the cylindrical housing to enable viewing of the needle guard and the interaction of the needle guard with the needle from outside the cylindrical housing.

12. The combination of claim 1, wherein the needle guard has a back wall through which the needle passes, and wherein the needle has a protrusion proximal the distal tip that has a dimension that prevents the needle from further passing the back wall when the protrusion contacts the back wall such that when the needle is withdrawn in the proximal direction relative to the catheter hub with the distal tip of the needle captured in the needle guard, the cylindrical housing, if coupled to the catheter hub, is separable from the catheter hub.

13. The combination of claim 1, wherein the catheter hub has a central bore defined between the distal end and the proximal end, a septum positioned in the central bore;

wherein the needle slidably extends along the central axis through the septum and the central bore into the catheter; wherein the cylindrical housing is positioned between the needle hub and the catheter hub with the enlarged distal end portion of the cylindrical housing coupled to the proximal end of the catheter hub and the distal tip of the needle extending beyond the distal end of the catheter when the catheter assembly is in a ready position; and wherein the distal tip of the needle is captured by the needle guard and the cylindrical housing is separable from the catheter hub when the catheter assembly is in a safe position.

14. The combination of claim 13, wherein the catheter hub includes a side port in fluid communication with the central bore, and wherein when the catheter assembly is in the safe position, the enlarged distal end portion of the cylindrical housing is separated from the proximal end of the catheter hub so that a fluid communication path is established between the side port and the catheter through the central bore of the catheter hub.

* * * * *